US012573190B2

(12) United States Patent (10) Patent No.: US 12,573,190 B2
Berkeman et al. (45) Date of Patent: Mar. 10, 2026

(54) COMPUTER SOFTWARE MODULE ARRANGEMENT, A CIRCUITRY ARRANGEMENT, AN ARRANGEMENT AND A METHOD FOR IMPROVED OBJECT DETECTION

(71) Applicant: Telefonaktiebolaget LM Ericsson (publ), Stockholm (SE)

(72) Inventors: Anders Berkeman, Lund (SE); Fredrik Dahlgren, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 300 days.

(21) Appl. No.: 18/033,385

(22) PCT Filed: Oct. 27, 2020

(86) PCT No.: PCT/EP2020/080178
§ 371 (c)(1),
(2) Date: Apr. 24, 2023

(87) PCT Pub. No.: WO2022/089730
PCT Pub. Date: May 5, 2022

(65) Prior Publication Data
US 2023/0334841 A1 Oct. 19, 2023

(51) Int. Cl.
*G06V 10/82* (2022.01)
*G06V 10/764* (2022.01)
*G06V 10/776* (2022.01)

(52) U.S. Cl.
CPC ............ *G06V 10/82* (2022.01); *G06V 10/764* (2022.01); *G06V 10/776* (2022.01)

(58) Field of Classification Search
CPC ..... G06V 10/82; G06V 10/776; G06V 10/764
See application file for complete search history.

(56) References Cited

U.S. PATENT DOCUMENTS 10,019,654 B1 7/2018 Pisoni
10,380,853 B1 * 8/2019 Solh .................... G06F 18/2321
(Continued)

FOREIGN PATENT DOCUMENTS

CN 110009679 A 7/2019
CN 111104831 A 5/2020
(Continued)

OTHER PUBLICATIONS

Bank, Dor , et al., "Improved Training for Self Training by Confidence Assessments", arXiv; Proceedings of the 2018 Computing Conference, vol. 1, Apr. 5, 2018, 1-5.
(Continued)

*Primary Examiner* — Lixi C Simpson
(74) *Attorney, Agent, or Firm* — Murphy, Bilak & Homiller, PLLC

(57) ABSTRACT

An object detection arrangement (100) comprising a controller (101) configured to detect objects utilizing a multiscale convolutional neural network, wherein the controller (101) is further configured to: receive (312, 410) image data representing an image (10) comprising an object to be detected (11) being at a distance (d) into the image (10); classify (314, 430) whether the object to be detected (11) is at risk of being incorrectly detected based on the distance (d); and if so adapt (315, 440) the object detection accordingly.

10 Claims, 17 Drawing Sheets

(56) References Cited

U.S. PATENT DOCUMENTS

| | | | |
|---|---|---|---|
| 2014/0152676 A1 | 6/2014 | Rohn et al. | |
| 2016/0171344 A1 | 6/2016 | Chen et al. | |
| 2016/0224833 A1 | 8/2016 | Jin | |
| 2017/0286779 A1 | 10/2017 | Fan et al. | |
| 2018/0089505 A1 | 3/2018 | El-Khamy et al. | |
| 2018/0096457 A1 | 4/2018 | Savvides et al. | |
| 2019/0058859 A1* | 2/2019 | Price | H04N 13/271 |
| 2019/0130230 A1* | 5/2019 | Kang | G06F 18/2433 |
| 2019/0180119 A1 | 6/2019 | Chen et al. | |
| 2019/0205676 A1 | 7/2019 | Miyamoto | |
| 2019/0258878 A1 | 8/2019 | Koivisto et al. | |
| 2019/0392606 A1 | 12/2019 | Hisada | |
| 2020/0210726 A1 | 7/2020 | Yang et al. | |
| 2021/0056365 A1* | 2/2021 | Sivan | G06V 20/58 |
| 2023/0334841 A1 | 10/2023 | Berkeman et al. | |
| 2023/0401820 A1 | 12/2023 | Dahlgren et al. | |

FOREIGN PATENT DOCUMENTS

| | | | |
|---|---|---|---|
| CN | 111801689 A | 10/2020 | |
| EP | 3579147 A1 | 12/2019 | |
| WO | 2019028725 A1 | 2/2019 | |

OTHER PUBLICATIONS

Deng, Zhipeng , et al., "Multi-scale object detection in remote sensing imagery with convolutional neural networks", ISPRS Journal of Photogrammetry and Remote Sensing, vol. 145, Part A, Nov. 2018, 1-10.

Jiang, Heinrich , et al., "To Trust Or Not To Trust A Classifier", arXiv, Cornell University Library, Oct. 26, 2018, 1-25.

Khosla, Cherry , et al., "Enhancing Performance of Deep Learning Models with different Data Augmentation Techniques: A Survey", 2020 International Conference on Intelligent Engineering and Management (ICIEM), Jun. 17, 2020, 1-7.

Sharma, Vipul , et al., "A comprehensive and systematic look up into deep learning based object detection techniques: A review", Department of Computer Science & Engineering, National Institute of Technology, May 12, 2020, 1-29.

Ying, Xiang , et al., "Multi-Attention Object Detection Model in Remote Sensing Images Based on Multi-Scale", IEEE Access IEEE, USA, vol. 7, 2019, 1-12.

Küppers, et al., "Multivariate Confidence Calibration for Object Detection", Proceedings of the IEEE/CVF conference on computer vision and pattern recognition workshops, Jun. 2020, 1-9.

* cited by examiner

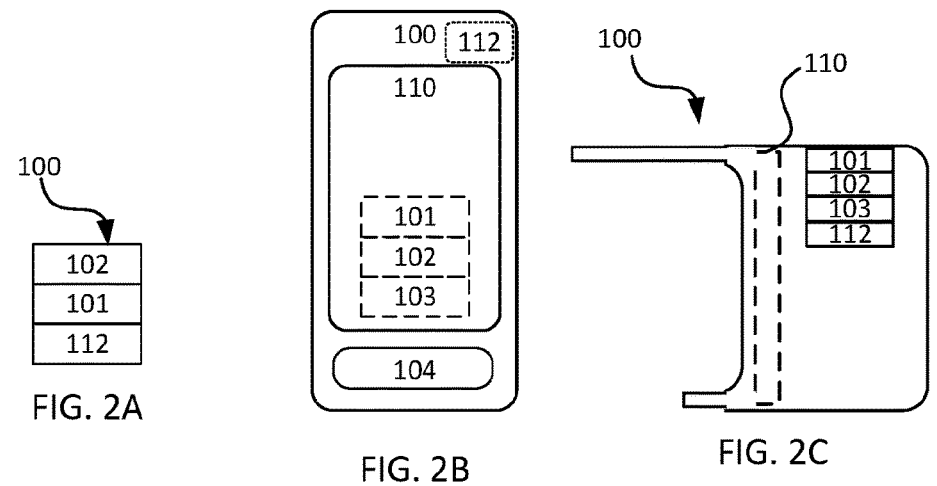
FIG. 2A
FIG. 2B
FIG. 2C
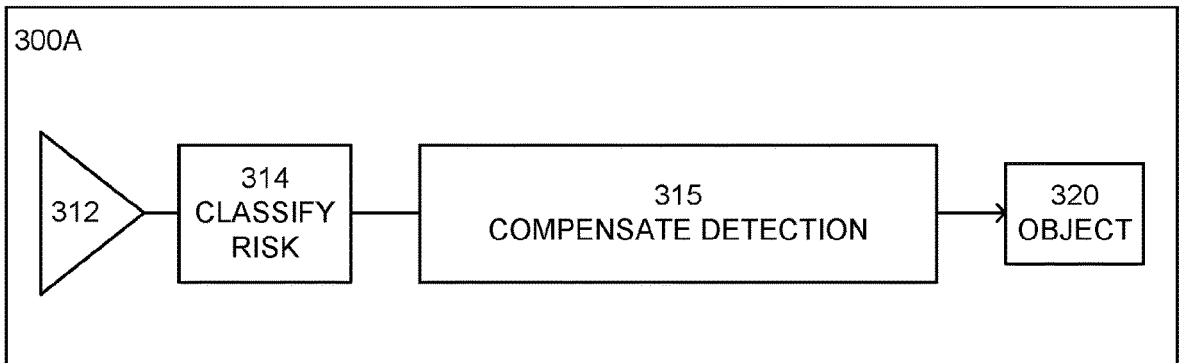
FIG. 3A

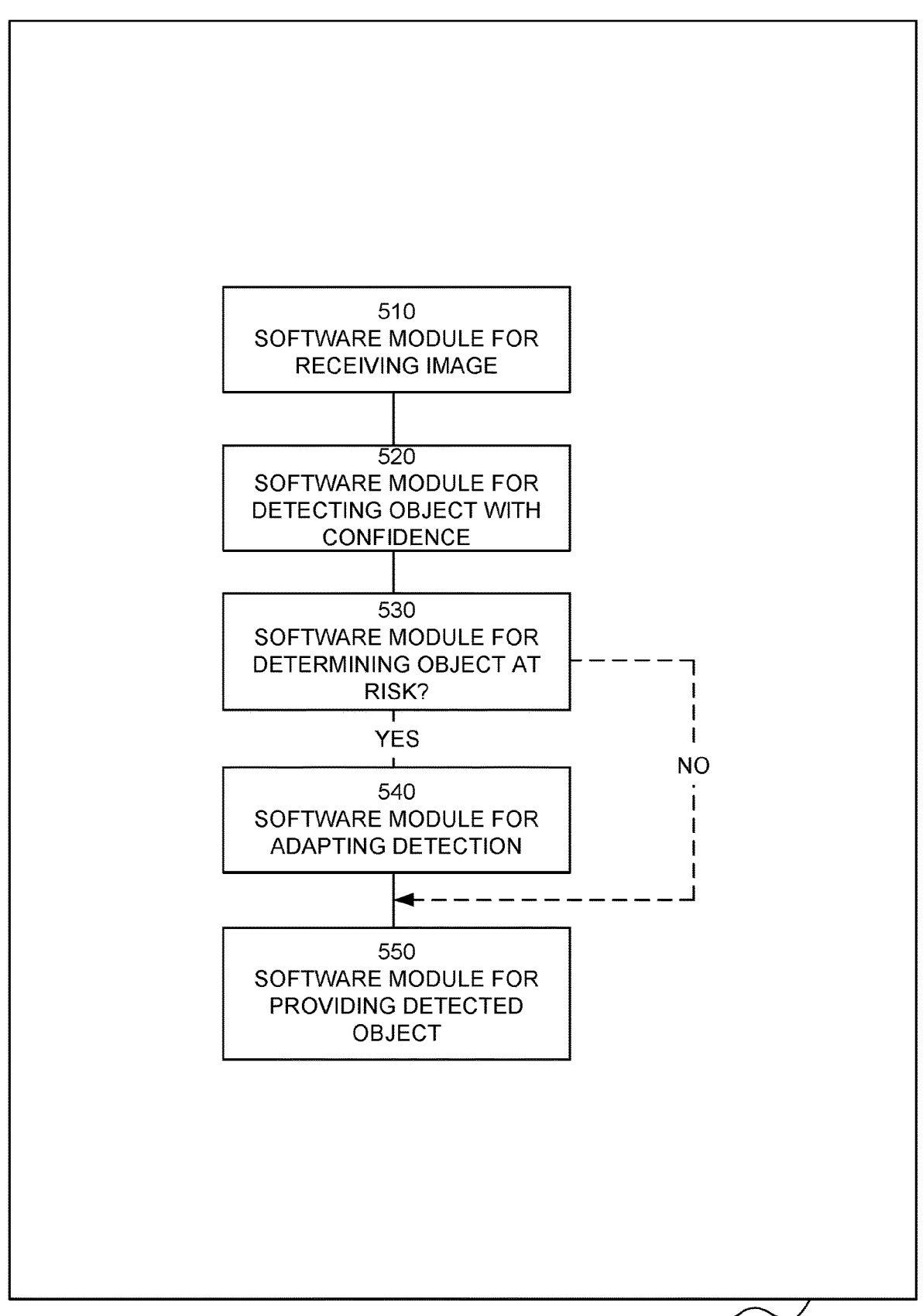
Fig.5A          500

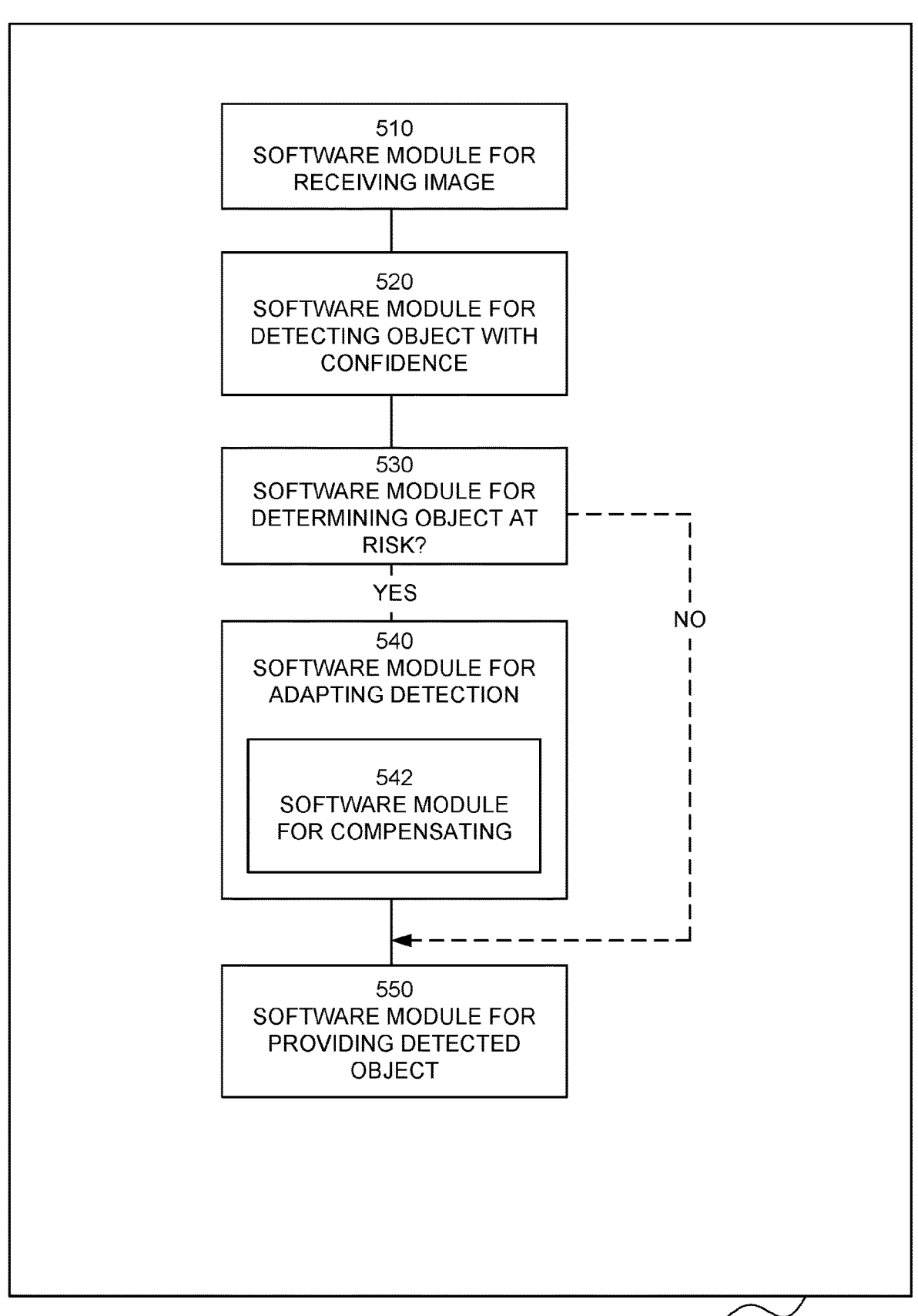
Fig.5B          500

500

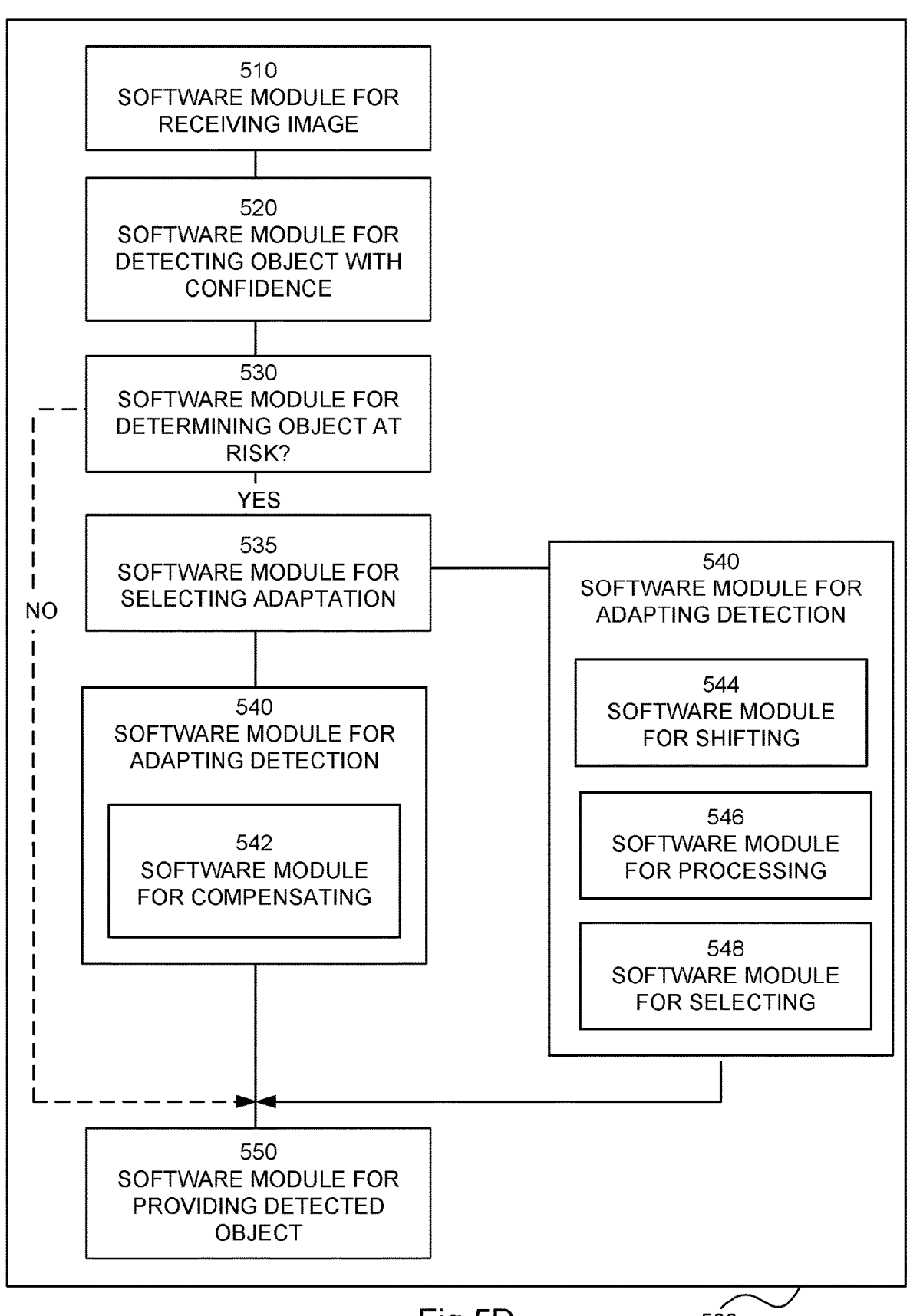
Fig.5D     500

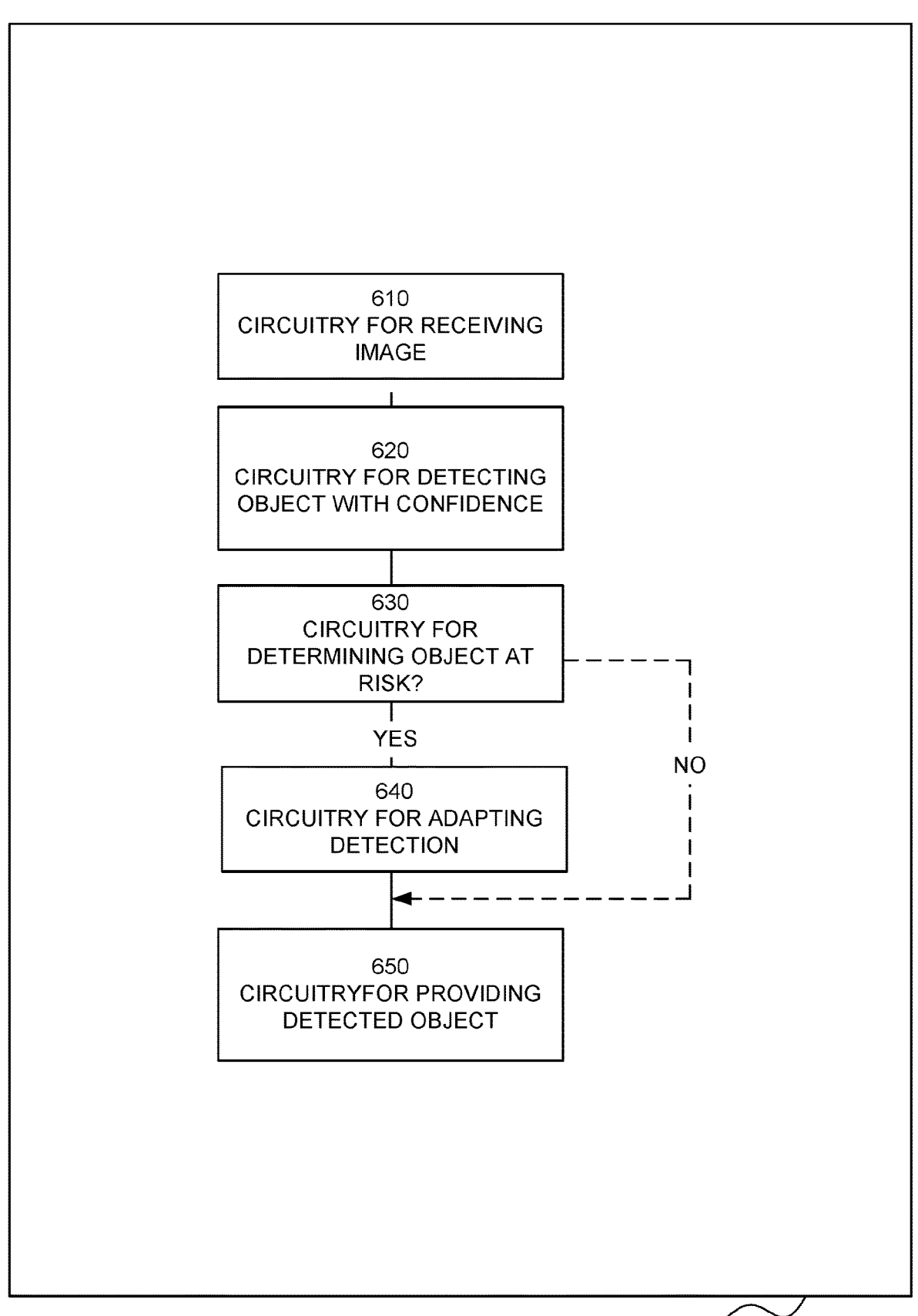
Fig.6A                                    600

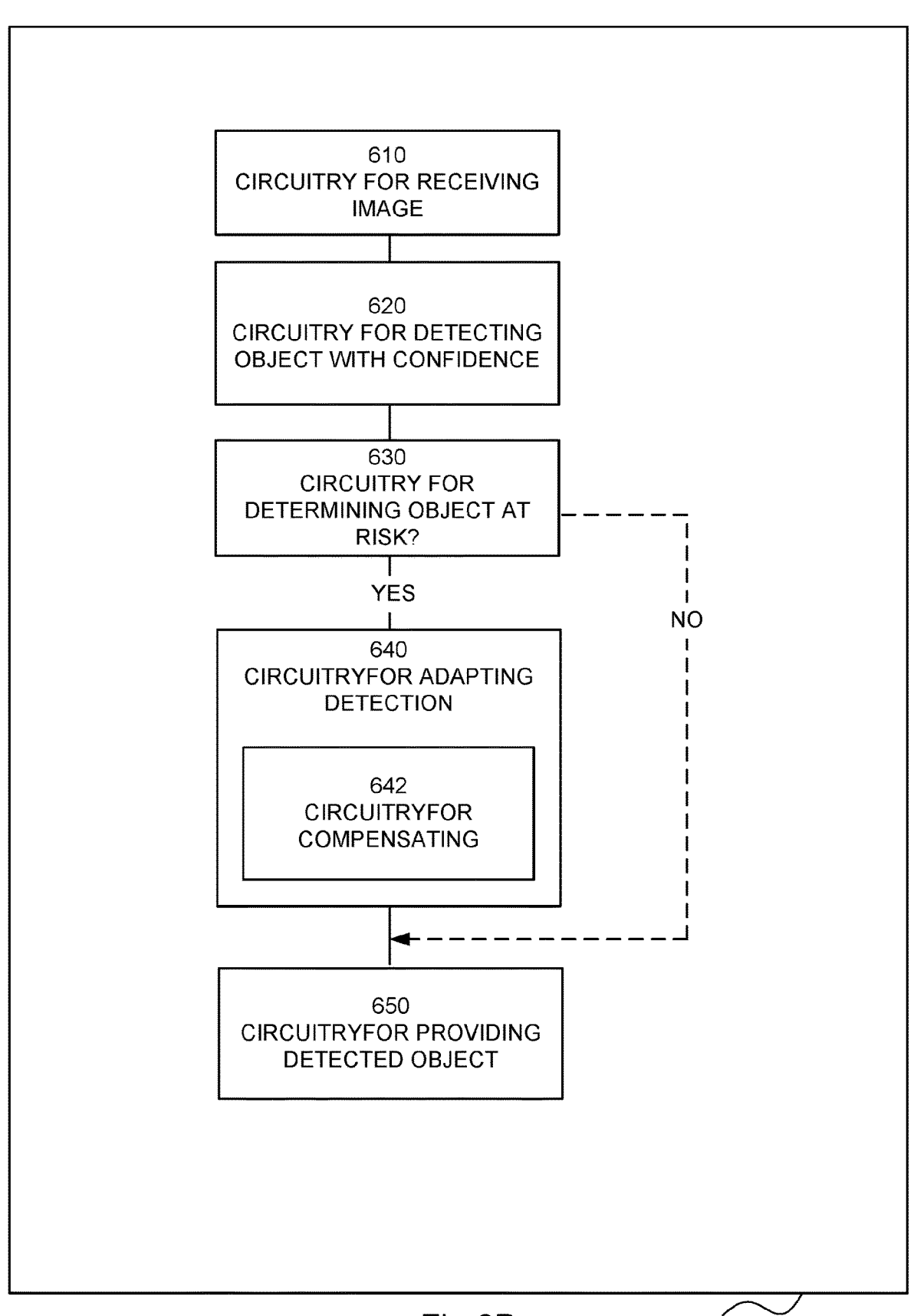
Fig.6B                                    600

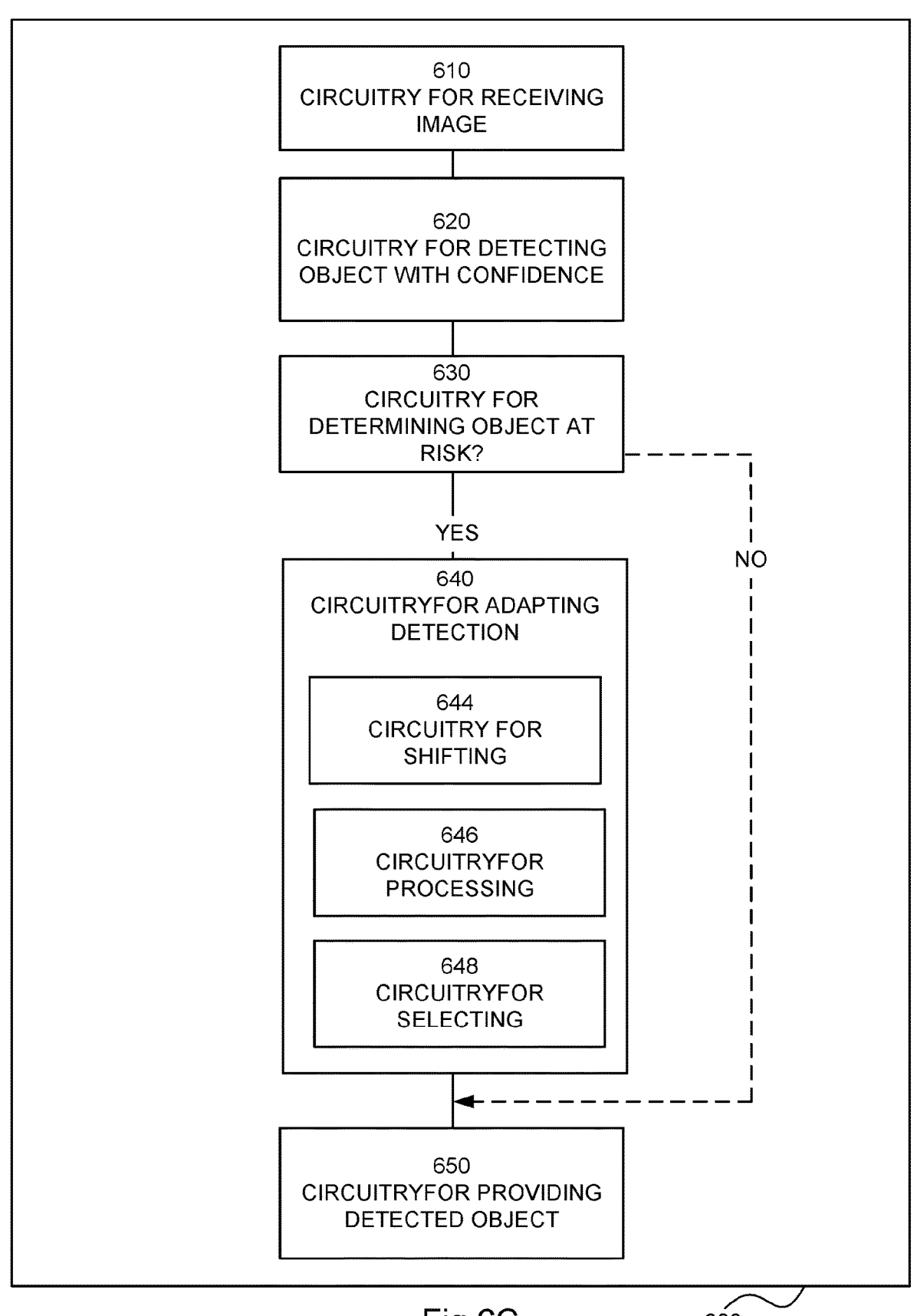
Fig.6C     600

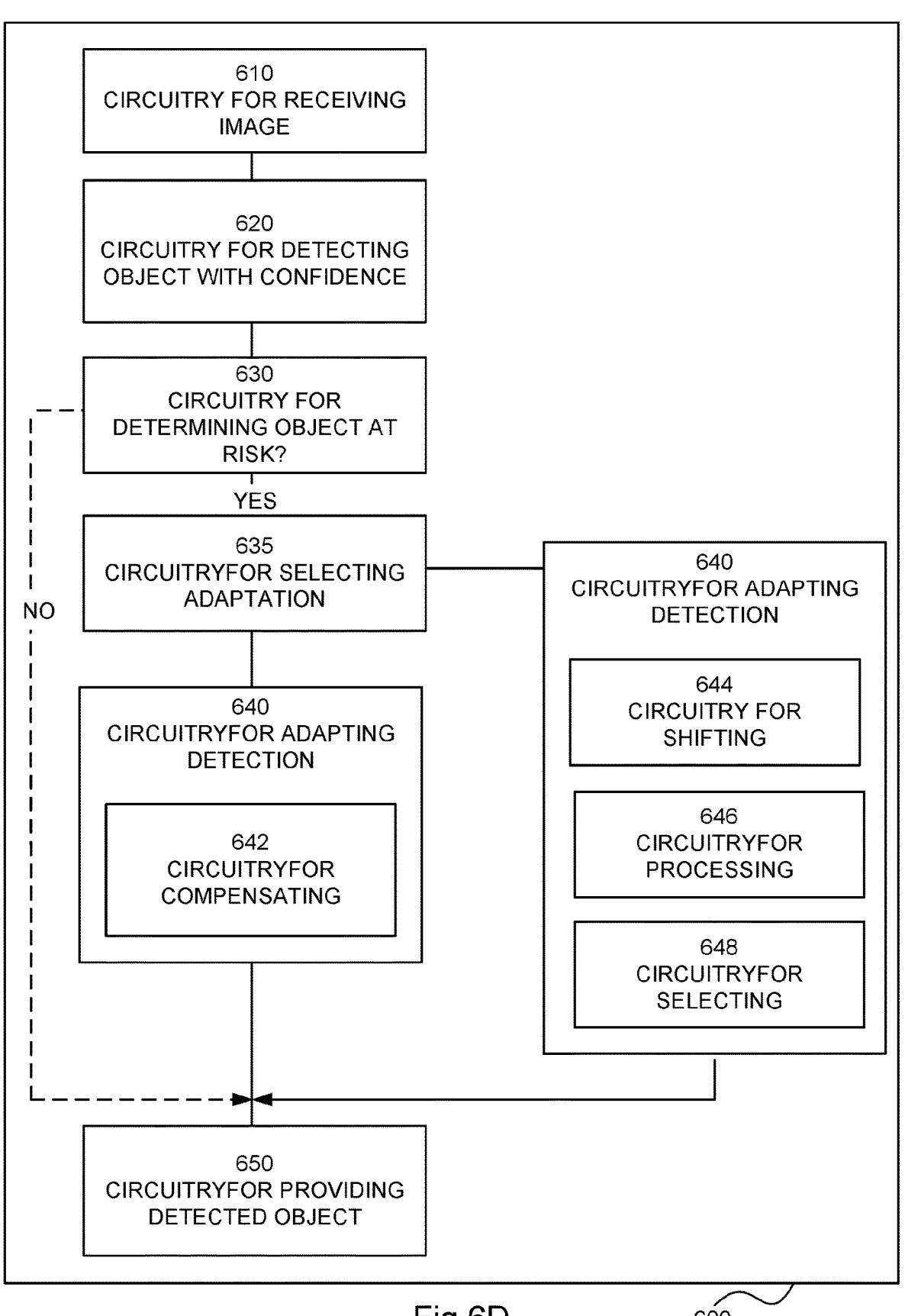
Fig.6D                                          600

COMPUTER SOFTWARE MODULE ARRANGEMENT, A CIRCUITRY ARRANGEMENT, AN ARRANGEMENT AND A METHOD FOR IMPROVED OBJECT DETECTION

TECHNICAL FIELD

The present invention relates to an arrangement, an arrangement comprising computer software modules, an arrangement comprising circuits, a device and a method for providing an improved manner of object detection, and in particular to an arrangement, an arrangement comprising computer software modules, an arrangement comprising circuits, a device and a method for providing an improved manner of object detection through improved object detection.

BACKGROUND

Object detection is a computer technology related to computer vision and object detection that deals with detecting instances of semantic objects of a certain class (such as humans, buildings, or cars) in digital images and videos. Well-researched domains of object detection include face detection and pedestrian detection. Object detection has applications in many areas of computer vision, including image retrieval and video surveillance. Methods for object detection generally fall into either machine learning-based (such as deep learning) approaches or classical approaches. Deep learning techniques are able to do end-to-end object detection (without specifically defining features as in machine learning approaches), and are typically based on convolutional neural networks (CNN), such as SSD (Single Shot Detector) or Region Proposals R-CNN, or variations such as Fast R-CNN, Faster R-CNN, or cascade R-CNN.

During object detection utilizing a CNN, it has become commonplace to adopt a so-called multi-scale CNN. A multi-scale CNN is basically a collection or group of CNN models with varying input size and where the output of those parallel layers are later combined for a determination or detection of the relevant object(s). Multi-scale CNNs are particularly useful in detecting objects of different sizes in images (or video streams). A typical implementation of such a multi-scale CNN is where the data is downscaled (and later up-scaled) in multiple steps. This downscaling (and up-scaling) is typically done with a factor of two for each step (multiple steps). This type of structure has been shown to be very useful in detecting features of different sizes, and has therefore become frequently used and widely adapted.

However, after insightful and inventive reasoning and experimental research, the inventors have realized that there is a hitherto unknown problem and also identified the hitherto unknown problem. The inventors have thus also identified a need for solving such problem.

SUMMARY

As discussed above, the inventors have realized and also identified a previously unknown problem that has so far also been undetected. The mere realization of this problem is thus inventive in itself. As object detection is utilized in so many aspects of modern life, it is imperative that a solution be provided, which the inventors have also provided, which is also inventive in itself. Moreover, the solutions provided are simple and elegant, which is also inventive.

FIG. 1A shows an example image 10, where two types of objects 11 are found; two cars 11A, 11B and three persons 11C, 11D, 11E. The objects cars and persons are only examples of objects and it should be stated that the problem that will be discussed herein is not limited to any type of particular object, but applies equally to all types of objects. The objects 11 of this example image 10 are a first car 11A at a first horizontal distance HD1 into the image 10, a second, slightly larger car 11B at a second horizontal distance HD2 into the image 10, a first person 11C at a first vertical distance VD1 into the image 10, a second, slightly smaller person 11D at a same first vertical distance VD1 into the image 10, and a third person 11E being of the same size as the second person 11D, but at a second vertical distance VD2 into the image 10. In this example, the horizontal distances are indicate from left to right and the vertical distances are indicated from top to bottom, but it should be noted that the distances may be measured in opposite directions as well and that the distances may be measured in different ways.

As can be seen, and as is stated the objects are of different sizes and so a multi-scale CNN would most commonly be employed to detect the objects. It should be noted that a multi-scale CNN might be employed to detect the objects regardless of the differences—if any—in sizes. It should also be noted that it is not the actual size that is relevant to the problem identified and that the problem will apply equally to large as to small objects.

The inventors have realized, after insightful and inventive reasoning, that errors or low confidences when detecting objects are in some cases related to the location of the object within the image in that some locations would provide a lower confidence for the detection of an object. The inventors have further realized, after insightful and inventive reasoning, that such locations are dependent on the shape or extent of the object being detected. And, even more specifically, the inventors have realized, after insightful and inventive reasoning, that objects suffer from a lower confidence at locations that affect the interpretation of their corresponding extent. This means that objects 11 having an extent (such as the cars 11A and 11B) that is primarily horizontal will primarily suffer from a lower confidence (when detecting the object) at locations of certain horizontal distances HD and that objects 11 having an extent (such as the persons 11C, 11D and 11E) that is primarily vertical will primarily suffer from a lower confidence at locations of certain vertical distances.

However, as the other extent will also be affected negatively if at a corresponding distance, the inventors are also providing for compensating for both a vertical and horizontal extent if at a certain horizontal and/or certain vertical distance.

For the context of the description herein a horizontal extent will be defined as an extent where the width (referenced W in FIG. 1A) is larger than the height (referenced H in FIG. 1A) and a vertical extent will be defined as an extent where the width is smaller than the height. In one interpretation the width would be larger/smaller by a factor larger than 1 for defining the object's extent as either vertical or horizontal. Examples of such factors are 1, 1.1, 1.25, 1.5, and 2.

As mentioned above, in some embodiments, both (or any of the two) extents may be compensated for.

Thus, not only have the inventors realized the existence of the problem, but they have also realized the details of the problem. It should be noted that since CNNs are trained on such a vast number of objects of incredible variance, there are so many factors at play that isolating some of these and contributing them to a problem is indeed an impressive accomplishment.

The inventors have also confirmed and verified the problem they have realized through experimental research.

As indicated above, the inventors have also realized that the main contributing factor to the problem is the location of an object, not the size of the object. However, as will be discussed below, the size of an object does also come into play.

Furthermore, the inventors have realized the cause of the problem. The cause being the scaling performed in the multi-scale CNNs.

FIG. 1B shows a series or plots 21, 22, 23 of confidence values C for objects 11 versus their distance (vertical VD and horizontal HD) into an image 10. The two upper graphs or plots 21, 22 show the confidences C for a horizontal object (such as a car 11A, 11B in FIG. 1A) plotted against a distance d, here being the horizontal distance HD into the image (referenced 10 in FIG. 1A). The upper plot 21 is for a smaller object (such as the small car 11A in FIG. 1A) and the middle plot 22 is for a larger object (such as the large car 11B in FIG. 1A). The bottom plot 23 shows the confidences C for a vertical object (such as a person 11, C, 11D, 11E in FIG. 1A) plotted against a distance d, here being the vertical distance VD into the image (referenced 10 in FIG. 1A). As can be seen from plots 21, 22 and 23, the confidence C sinks or is lowered at regular intervals for the distance into the image. In this instance there is a dip or through in confidence C at every 16 pixels. The inventors have also identified that for objects of a particularly small size (as in falling under a size threshold value) there is an additional dip in between each dip, or rather there is a dip in confidence at every 8 pixels of distance. The confidence dips thus occur around and at a confidence distance (referenced cd in FIG. 1B) into the image regardless of actual size. The only effect of the size is whether the object falls under or over a threshold size value, in which case the confidence distance doubles (if falling over the threshold).

It should also be noted that the confidence distance is the same for both vertical and horizontal distances into the image and the distance will thus hereafter be referred to as a corresponding distance for an object, where the direction of the distance is determined by the classification of the object, vertical or horizontal.

It should be noted that the values of the confidence distance cd are only examples and may vary depending on the properties of the CNN used and the scaling factors used. However, for most commonly used CNNs having a scaling factor of 2 they apply.

It should also be noted that the confidence distance cd may be different for vertical distances and horizontal distances in case different scaling factors are used.

The confidence distance may be based on experiments where they are in essence measure. The confidence distance may also be derived from properties of the CNN, such as the scaling factors as discussed above.

An object of the present teachings is thus to overcome or at least reduce or mitigate the problems discussed in the above with reference to FIGS. 1A and 1B.

According to one aspect an object detection arrangement is provided, the object detection arrangement comprises a controller configured to detect objects utilizing a multi-scale convolutional neural network, wherein the controller is further configured to: receive image data representing an image comprising an object to be detected being at a distance (d) into the image; classify whether the object to be detected is at risk of being incorrectly detected based on the distance (d); and if so adapt the object detection accordingly.

In one embodiment the controller is further configured to classify whether the object to be detected is at risk of being incorrectly detected based on the distance (d) by determining if the distance (d) is at a multiple of a confidence distance (cd) plus a distance constant.

In one embodiment the controller is further configured to classify whether the object to be detected is at risk of being incorrectly detected based on the distance (d) by determining if the distance (d) is within a marginal range of the multiple of the confidence distance (cd).

In one embodiment the controller is further configured to classify whether the object to be detected is at risk of being incorrectly detected based on the distance (d) by determining if the size of the object is above a size threshold, in which case the multiple to be multiplied to the confidence distance (cd) is an even multiple.

In one embodiment the controller is further configured to classify whether the object to be detected is at risk of being incorrectly detected based on the distance (d) by determining whether the object to be detected is a vertical object, wherein the distance (d) is a vertical distance (VD) and the confidence distance represents a vertical distance, and/or, whether the object to be detected is a horizontal object, wherein the distance (d) is a horizontal distance (HD) and the confidence distance represents a horizontal distance.

In one embodiment the controller is further configured to classify whether the object to be detected is at risk of being incorrectly detected based on the distance (d) by first determining that a provided confidence value (C) is within a confidence interval.

In one embodiment the confidence interval is the range below a class threshold for determining that the object to be detected is of the corresponding class.

In one embodiment the confidence distance is based on a scaling factor of the multi-scale CNN.

According to one aspect a method for object detection utilizing a multi-scale CNN in an object detection arrangement is provided, wherein the method comprises: receiving image data representing an image comprising an object to be detected being at a distance (d) into the image; classifying whether the object to be detected is at risk of being incorrectly detected based on the distance (d); and if so adapting the object detection accordingly.

According to one aspect there is provided a software module arrangement for object detection utilizing a multi-scale CNN in an object detection arrangement, wherein the software module arrangement comprises: a software module for receiving image data representing an image comprising an object to be detected being at a distance (d) into the image; a software module for classifying whether the object to be detected is at risk of being incorrectly detected based on the distance (d); and if so a software module for adapting the object detection accordingly.

According to one aspect there is provided an object detection arrangement comprising circuitry for object detection utilizing a multi-scale CNN comprising: circuitry for receiving image data representing an image comprising an object to be detected being at a distance (d) into the image; circuitry for classifying whether the object to be detected is at risk of being incorrectly detected based on the distance (d); and if so circuitry for adapting the object detection accordingly.

According to one aspect there is provided an object detection arrangement comprising a controller configured to detect objects utilizing a multi-scale convolutional neural network, wherein the controller is further configured to: receive image data representing an image comprising an object to be detected being at a distance (d) into the image; classify whether the object to be detected is at risk of being incorrectly detected based on the distance (d); and if so compensate the object detection by adapting object detection parameters.

In one embodiment the controller is configured to adapt the object detection parameters by lowering a class threshold.

In one embodiment the controller is configured to adapt the object detection parameters by increasing a confidence (C) for the object.

In one embodiment the controller is configured to adapt the object detection parameters by lowering the class threshold and by increasing the confidence (C) for the object.

In one embodiment the controller is configured to lower the class threshold an amount based on a distance of the object from a multiple of a confidence distance (cd).

In one embodiment the controller is configured to increase the confidence (C) for the object an amount based on a distance from a multiple of a confidence distance (cd).

In one embodiment the controller is configured to classify whether the object to be detected is at risk of being incorrectly detected based on the distance (d) during the compensated detection.

In one embodiment the controller is configured to classify whether the object to be detected is at risk of being incorrectly detected based on the distance (d) and to adapt the object detection parameters by retrieving the parameters to be used through a table lookup, wherein the look up table carries parameters to be used for objects depending on the distance (d).

In one embodiment the object detection arrangement further comprises a memory enabled to store the lookup table.

In one embodiment the object detection arrangement further comprises a communication interface for retrieving information from the lookup table.

According to one aspect there is provided a method for object detection utilizing a multi-scale CNN in an object detection arrangement, wherein the method comprises: receiving image data representing an image comprising an object to be detected being at a distance (d) into the image; classifying whether the object to be detected is at risk of being incorrectly detected based on the distance (d); and if so compensating the object detection by adapting object detection parameters.

According to one aspect there is provided a software module arrangement for object detection utilizing a multi-scale CNN in an object detection arrangement, wherein the software module arrangement comprises: a software module for receiving image data representing an image comprising an object to be detected being at a distance (d) into the image; a software module for classifying whether the object to be detected is at risk of being incorrectly detected based on the distance (d); and if so a software module for compensating the object detection by adapting object detection parameters.

According to one aspect there is provided an object detection arrangement comprising circuitry for object detection utilizing a multi-scale CNN comprising: circuitry for receiving image data representing an image comprising an object to be detected being at a distance (d) into the image; circuitry for classifying whether the object to be detected is at risk of being incorrectly detected based on the distance (d); and if so circuitry for compensating the object detection by adapting object detection parameters.

According to one aspect there is provided an object detection arrangement comprising a controller configured to detect objects utilizing a multi-scale convolutional neural network, wherein the controller is further configured to: receive image data representing an image comprising an object to be detected being at a distance (d) into the image; classify whether the object to be detected is at risk of being incorrectly detected based on the distance (d); and if so compensate the object detection by shifting the image.

In one embodiment the controller is further configured to shift the image a shifting distance (sd) which is larger than a marginal distance (md) and lower than a confidence distance (cd), wherein the object to be detected is at risk of being incorrectly detected if the distance (d) is within the marginal distance (md) of a multiple of the confidence distance (cd).

In one embodiment the controller is further configured to compensate the object detection by shifting the image by performing a first object detection on the image and shifting the image and performing a second object detection on the shifted image and comparing the results of the first and second object detections.

In one embodiment the object detection on the image provides a first confidence (C1) and object detection on the shifted image provides a second confidence (C1), wherein the controller is further configured to compare the results by comparing the first confidence (C1) and the second confidence (C2).

In one embodiment the controller is further configured to classify whether the object to be detected is at risk of being incorrectly detected based on the distance (d) by determining that the second confidence (C2) is higher than the first confidence (C1).

In one embodiment the controller is configured to shift the image by shifting a subsequent image.

In one embodiment the controller is configured to shift the image by shifting the image providing a second instance of the image and feeding the second instance to the object detection.

According to one aspect there is provided a method for object detection utilizing a multi-scale CNN in an object detection arrangement, wherein the method comprises: receiving image data representing an image comprising an object to be detected being at a distance (d) into the image; classifying whether the object to be detected is at risk of being incorrectly detected based on the distance (d); and if so compensating the object detection by shifting the image.

According to one aspect there is provided a software module arrangement for object detection utilizing a multi-scale CNN in an object detection arrangement, wherein the software module arrangement comprises: a software module for receiving image data representing an image comprising an object to be detected being at a distance (d) into the image; a software module for classifying whether the object to be detected is at risk of being incorrectly detected based on the distance (d); and if so a software module for compensating the object detection by shifting the image.

According to one aspect there is provided an object detection arrangement comprising circuitry for object detection utilizing a multi-scale CNN comprising: circuitry for receiving image data representing an image comprising an object to be detected being at a distance (d) into the image; circuitry for classifying whether the object to be detected is at risk of being incorrectly detected based on the distance (d); and if so circuitry for compensating the object detection by shifting the image.

According to one aspect there is provided an object detection arrangement comprising a controller configured to detect objects utilizing a multi-scale convolutional neural network, wherein the controller is further configured to: receive image data representing an image comprising an object to be detected being at a distance (d) into the image; classify whether the object to be detected is at risk of being incorrectly detected based on the distance (d); and if so compensate the object detection by adapting object detection parameters and by shifting the image.

In one embodiment the controller is further configured to compensate the object detection by shifting the image by performing a first object detection on the image and shifting the image and performing a second object detection on the shifted image and adapting the object detection parameters based on the results of the first and second object detections.

In one embodiment the controller is further configured to adapt the object detection parameters based on the results of the first and second object detections, wherein the object detection parameters are adapted based on a difference in confidences provided by the first object detection and the second object detection.

In one embodiment the object detection arrangement further comprises a communication interface, wherein the controller is further configured to shift the image by causing a remote controller to shift the image and perform object detection on the shifted image through the communication interface.

In one embodiment the controller is configured to shift the image to set up the adaptation.

In one embodiment the controller is configured to shift the image to validate the adaptation.

In one embodiment the controller is configured to shift the image to correct the adaptation.

According to one aspect there is provided a method for object detection utilizing a multi-scale CNN in an object detection arrangement, wherein the method comprises: receiving image data representing an image comprising an object to be detected being at a distance (d) into the image; classifying whether the object to be detected is at risk of being incorrectly detected based on the distance (d); and if so compensating the object detection by adapting object detection parameters and by shifting the image.

According to one aspect there is provided a software module arrangement for object detection utilizing a multi-scale CNN in an object detection arrangement, wherein the software module arrangement comprises: a software module for receiving image data representing an image comprising an object to be detected being at a distance (d) into the image; a software module for classifying whether the object to be detected is at risk of being incorrectly detected based on the distance (d); and if so a software module for compensating the object detection by adapting object detection parameters and by shifting the image.

According to one aspect there is provided an object detection arrangement comprising circuitry for object detection utilizing a multi-scale CNN comprising: circuitry for receiving image data representing an image comprising an object to be detected being at a distance (d) into the image; circuitry for classifying whether the object to be detected is at risk of being incorrectly detected based on the distance (d); and if so circuitry for compensating the object detection by adapting object detection parameters and by shifting the image.

In one embodiment of any of the aspects the object detection arrangement is a smartphone or a tablet computer.

In one embodiment any of the aspects the object detection arrangement is an optical see-through device.

It should be noted that any, some or all of the aspects discussed herein may be combined or used to supplement each other, and that embodiments discussed in relation to one aspect may also be applicable to other aspects, and may thus be combined at will.

It should also be noted that in some embodiments the adaptation is done both for horizontal as well as vertical alignments.

According to one aspect there is provided a computer-readable medium carrying computer instructions that when loaded into and executed by a controller of an object detection arrangement enables the object detection arrangement to implement any of the methods herein.

The solution may be implemented as a software solution, a hardware solution or a mix of software and hardware components.

Further embodiments and advantages of the present invention will be given in the detailed description. It should be noted that the teachings herein find use in digital imagery arrangements in digital photography as well as many areas of computer vision, including image retrieval, robotic vision, augmented reality and video surveillance.

BRIEF DESCRIPTION OF THE DRAWINGS

Embodiments of the invention will be described in the following, reference being made to the appended drawings which illustrate non-limiting examples of how the inventive concept can be reduced into practice.

FIG. 2A shows a schematic view of an object detection arrangement according to an embodiment of the present invention;

FIG. 2B shows a schematic view of an object detection arrangement according to an embodiment of the present invention;

FIG. 2C shows a schematic view of an object detection arrangement according to an embodiment of the present invention;

FIG. 3A shows a schematic view of a general object detection model according to one embodiment of the teachings herein;

FIG. 5A shows a component view for a software module arrangement according to an embodiment of the teachings herein;

FIG. 5B shows a component view for a software module arrangement according to an embodiment of the teachings herein;

FIG. 5D shows a component view for a software module arrangement according to an embodiment of the teachings herein;

FIG. 6A shows a component view for an arrangement comprising circuits according to an embodiment of the teachings herein;

FIG. 6B shows a component view for an arrangement comprising circuits according to an embodiment of the teachings herein;

FIG. 6C shows a component view for an arrangement comprising circuits according to an embodiment of the teachings herein;

FIG. 6D shows a component view for an arrangement comprising circuits according to an embodiment of the teachings herein.

DETAILED DESCRIPTION

Figure 1A:
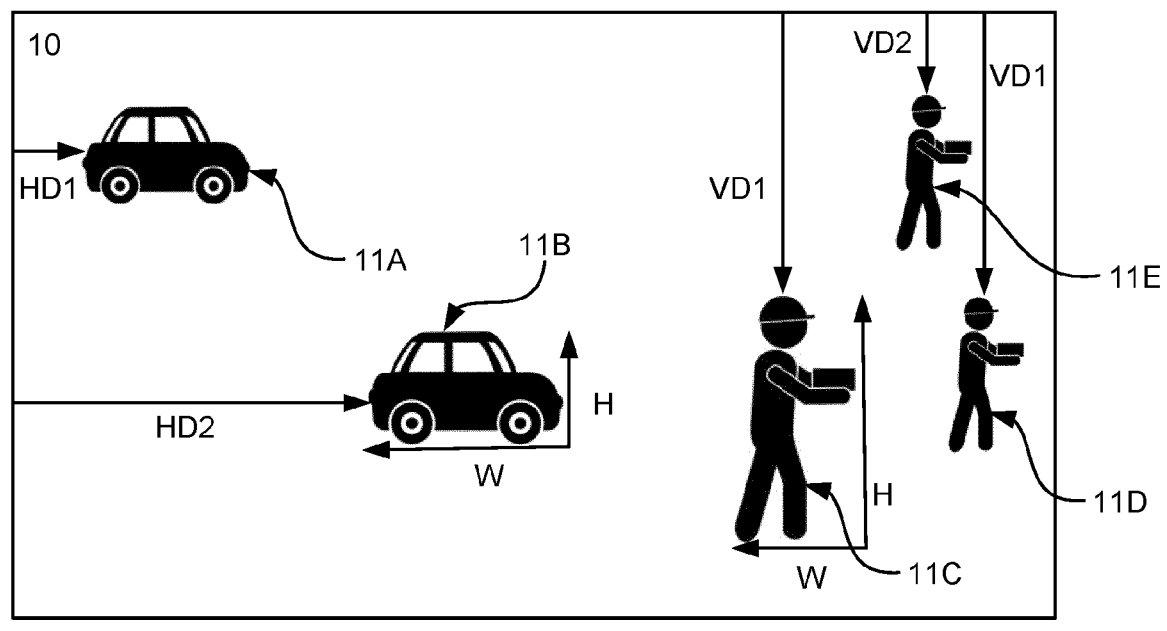
FIG. 1A shows a schematic view of an image comprising several objects.

FIG. 2A shows a schematic view of an object detection arrangement 100 according to an embodiment of the present invention. The object detection arrangement 100 comprises a controller 101, an image receiving device 112 and a memory 102. In one embodiment the image receiving device 112 is an image sensor comprised in a camera module, or alternatively the camera module. As a skilled person would understand the object detection arrangement 100 may comprise one controller 101 and the image receiving device 112 may comprise one controller, but for the purpose of the teachings herein, they will be considered to be the same controller 101 in order to cover all possible variations of exactly where the processing of an image takes place.

In one embodiment the image receiving device 112 is a communication interface for receiving image data through. In one such example the image data is received from the memory 102, wherein the image receiving device is a memory interface. In an alternative such embodiment, the image data is received from a remote source, wherein the image receiving device is a communication interface, such as discussed below referenced 103.

The controller 101 is configured to receive image data representative of one or more images (or at least a portion of an image) from the image receiving device 112, and to perform object detection on the received (portion of the) image(s). The image receiving device 112 may be comprised in the object detection arrangement 100 by being housed in a same housing as the object detection arrangement 100, or by being connected to it, by a wired connection or wirelessly.

It should be noted that the object detection arrangement 100 may comprise a single device or may be distributed across several devices and apparatuses.

The controller 101 is also configured to control the overall operation of the object detection arrangement 100. In one embodiment, the controller 101 is a graphics controller. In one embodiment, the controller 101 is a neural processing controller. In one embodiment, the controller 101 is a general purpose controller. In one embodiment, the controller 101 is a combination of a graphics controller, a neural processing controller and/or a general purpose controller. As a skilled person would understand there are many alternatives for how to implement a controller, such as using Field-Programmable Gate Arrays circuits, ASIC, GPU, NPU etc. in addition or as an alternative. For the purpose of this application, all such possibilities and alternatives will be referred to simply as the controller 101.

It should also be noted that in one embodiment, parts of or all of the processing is performed remotely, where a local controller 101 is configured to provide input data to a remote processing unit, such as in a cloud server, causing the remote processing unit to perform the processing and receiving the results of such processing as output from the remote processing unit. For the purpose of this application, such possibilities and alternatives will also be referred to simply as the controller 101, the controller thus representing both the local controller and the remote processing unit.

The memory 102 is configured to store data such as image data, settings and computer-readable instructions that when loaded into the controller 101 indicates how the object detection arrangement 100 is to be controlled. The memory 102 may comprise several memory units or devices, but they will be perceived as being part of the same overall memory 102. There may be one memory unit for a display arrangement storing graphics data, one memory unit for image receiving device storing settings, one memory for the communications interface (see below) for storing settings, and so on. As a skilled person would understand there are many possibilities of how to select where data should be stored and a general memory 102 for the object detection arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

It should be noted that the teachings herein find use in object detection arrangements 100 in many areas of digital imagery including digital photography (such as in smartphones), enhanced vision, computer vision, mixed or augmented reality systems, image retrieval, industrial use, automation, robotic vision, automated navigation or driving and video surveillance where a basic object detection arrangement 100 such as in FIG. 2A may be utilized.

It should be noted that any objects detected in an image need not be displayed to a user, nor does the image need to be displayed. In some embodiments the object detection will serve a purpose in a control application such as a surveillance application, a monitoring application or an automation application, where no visual output is needed of the image or the object. This also applies to the embodiments discussed in relation to FIGS. 2B and 2C even though those embodiments are focused on viewing devices.

FIG. 2B shows a schematic view of an object detection arrangement being a viewing device 100 according to an embodiment of the present invention. In this embodiment, the viewing device 100 is a smartphone or a tablet computer. In such an embodiment, the viewing device further comprises a display arrangement 110, which may be a touch-screen, and the image receiving device 112 may be a (series of) camera(s) of the smartphone or tablet computer. In such an embodiment the controller 101 is configured to receive an image from the (series of) camera(s) 112, process the image and most likely (but not necessarily) display the image on the display arrangement 110.

FIG. 2C shows a schematic view of an object detection arrangement being an optical see-through (OST) (including video-see-through) viewing device 100 according to an embodiment of the present invention. The viewing device 100 is a see-through device, where a user looks in through one end, and sees the real-life objects in the line of sight at the other end of the viewing device 100.

In one embodiment the viewing device 100 is a head-mounted viewing device 100 to be worn by a user (not shown explicitly in FIG. 2C) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

In one embodiment the viewing device 100 is a digital imagery device for providing enhanced vision (such as night vision).

In one embodiment the viewing device is a virtual, augmented reality or mixed reality device for providing a virtual reality, an augmented reality or a mixed reality to a user.

The viewing device 100 comprises an image receiving device 112 for receiving an image and a display arrangement 110 for presenting the captured and processed image to a viewer. As disclosed above with reference to FIG. 2A, the image receiving device 112 may be remote and comprised in the object detection arrangement through a connection to the object detection arrangement 100.

In the following, simultaneous reference will be made to the object detection arrangements 100 of FIGS. 2A, 2B and 2C.

In one embodiment the object detection arrangement 100 may further comprise a communication interface 103. The communication interface 103 may be wired and/or wireless. The communication interface may comprise several interfaces.

In one embodiment the communication interface 103 comprises a USB (Universal Serial Bus) interface. In one embodiment the communication interface 103 comprises a HDMI (High Definition Multimedia Interface) interface. In one embodiment the communication interface 103 comprises a Display Port interface. In one embodiment the communication interface 103 comprises an Ethernet interface. In one embodiment the communication interface 103 comprises a MIPI (Mobile Industry Processor Interface) interface. In one embodiment the communication interface comprises an analog interface, a CAN (Controller Area Network) bus interface, an I2C (Inter-Integrated Circuit) interface, or other interface.

In one embodiment the communication interface 103 comprises a radio frequency (RF) communications interface. In one such embodiment the communication interface 103 comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface 103 comprises a cellular communications interface such as a fifth generation (5G) cellular communication interface, an LTE (Long Term Evolution) interface, a GSM (Global Systéme Mobile) interface and/or other interface commonly used for cellular communication. In one embodiment the communication interface 103 is configured to communicate using the UPnP (Universal Plug n Play) protocol. In one embodiment the communication interface 103 is configured to communicate using the DLNA (Digital Living Network Appliance) protocol.

In one embodiment, the communication interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the object detection arrangement 100 and an external host device (not shown).

The communications interface 103 may be configured to enable the object detection arrangement 100 to communicate with other devices, such as other object detection arrangements 100 and/or smartphones, Internet tablets, computer tablets or other computers, media devices, such as television sets, gaming consoles, video viewer or projectors (not shown), or image receiving devices for receiving the image data.

A user interface 104 may be comprised in the object detection arrangement 100 (only shown in FIG. 2B). Additionally or alternatively, (at least a part of) the user interface 104 may be comprised remotely in the object detection arrangement 100 through the communication interface 103, the user interface 104 then (at least a part of it) not being a physical means in the object detection arrangement 100, but implemented by receiving user input through a remote device (not shown) through the communication interface 103. One example of such a remote device is a game controller, a mobile phone handset, a tablet computer or a computer.

The object detection arrangement 100 herein and as disclosed in relation to FIGS. 2A, 2B and 2C are configured to utilize multi-scale CNNs (such as Resnet SSD, Feature Pyramid Networks (FPN), MS-CNN, SSD-MSN et cetera) for object detection.

FIG. 3A shows a schematic view of a general object detection model 300A according to one embodiment of the teachings herein. The object detection model 300A is arranged to be executed by a controller 101 on object detection arrangement 100 according to herein, a software module arrangement 500 (see FIG. 5) according to herein, an arrangement comprising circuitry 600 (see FIG. 6) according to herein or being utilized by a method according to herein. It should be noted that different parts of the object detection model may be executed by different parts of the corresponding executing arrangement.

The object detection model 300A comprises an image data receiver 312 that receives image data corresponding to an image, such as has been discussed in the above. For the purposes of the teachings herein, it will be assumed that the image data comprises indications of one or more objects to be detected, i.e. classified. The image data has thus already undergone processing such as segmentation. In prior art systems, the image data would simply undergo a classification of the objects, i.e. object detection to provide classifications of the objects.

Object detection generally works by running data relating to a suspected object through a multi-scale CNN which produces a confidence value C indicating the confidence that the suspected object is of a particular class for all suspected objects. As is known, since there are a lot of potential objects in an image, the application employing the object detection uses thresholds for the confidence. The object is deemed to be of that class if the confidence falls above a class threshold. However, if the threshold is set too low, there might be many wrongly identified objects (false positives) and a high threshold is thus desired to avoid such false positives. As has been discussed in the summary above, the inventors have realized that there is a problem in multi-scale CNNs in that the location of certain objects will influence (lower) the confidence of the detection which will lead to many objects not receiving a confidence that exceeds the threshold and will thus not be detected properly.

The inventors are proposing to solve the problems as realized by the inventors and discussed herein by taking into account the location of the object when performing the detection.

The teachings herein are thus directed at object detection arrangements (such as those disclosed in relation to FIGS. 2A, 2B and 2C) that utilize multi-scale CNNs (such as Resnet SSD) for object detection.

As indicated in FIG. 1A an object 11 is at a distance d into the image. The distance d may be expressed as a vertical distance VD or a horizontal distance HD or both. As discussed in the above, the exact measurement of the distance is not crucial as the distance may be measured in many ways and in many directions. However a typical manner of measuring the distance is in pixels from the origo of the image's coordinate system. In one embodiment the distance is determined to the start of the object 11 in that direction (as in FIG. 1A). In one embodiment the distance is determined to the center of the object 11. In one embodiment the distance is determined to the start and end of the object 11 including the extent of the object 11.

The inventors are proposing an object detection model as indicated in FIG. 3A where a classification 314 of the risk of a misrepresented confidence is performed. If there is such a risk, or rather if the risk is considered to be significant, the object detection is compensated 315 accordingly so that an object 320 may be detected correctly.

In one embodiment, the risk is classified by determining the object 11 with regards to being a horizontal or a vertical object. As has been discussed above, an object 11 is classified to be a vertical object if the height H is larger than the width, or a constant multiplied with the width W, i.e. the object is vertical if H>cW, where c is the constant, and wherein c is 1, 1,1, 1,2 to mention a few examples. Similarly, an object 11 is classified to be a horizontal object if the width W is larger than the height H, or a constant multiplied with the width, i.e. the object is vertical if W>cH, where c is the constant, and wherein c is 1, 1.1, 1.2 to mention a few examples. In cases where the constant c is 1, the two test are exclusive and only one needs to be performed.

In one embodiment, the risk is classified by determining the distance d of the object 11 into the image 10. In one embodiment the distance d is determined to the center of the object 11. In one alternative or additional embodiment the distance d is determined to the object 11 and includes the extent of the object 11.

Figure 1B:
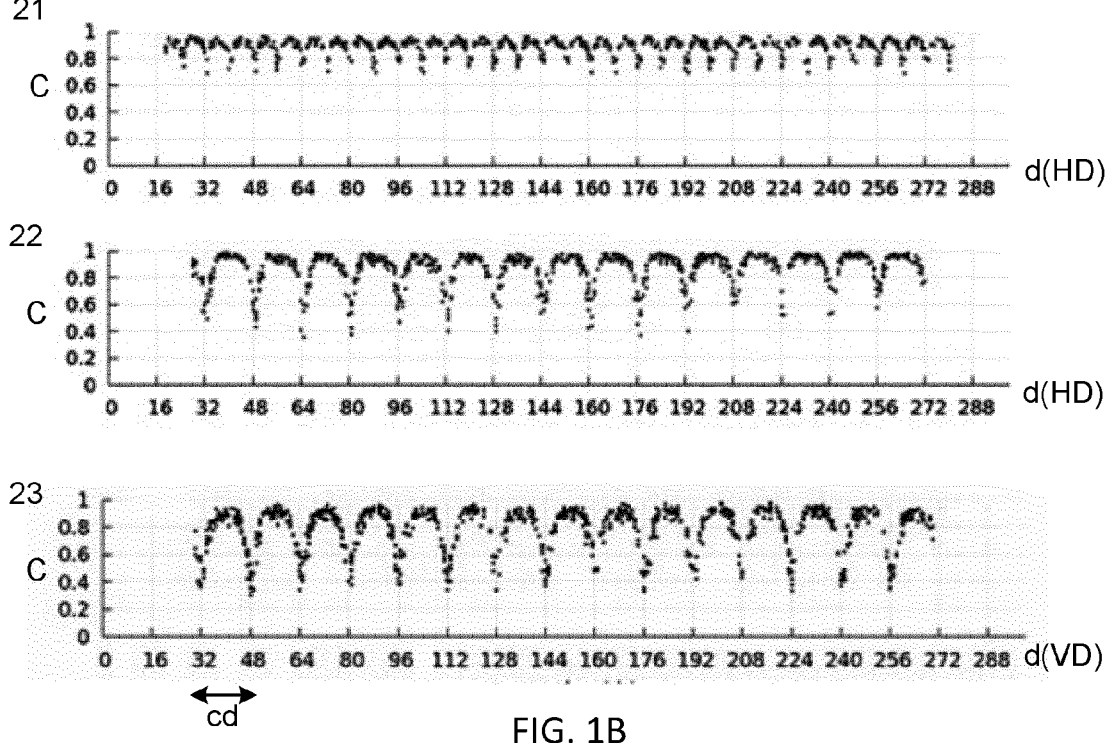
FIG. 1B shows a view of three plots for confidence values when detecting objects plotted against a distance into the image according to the prior art.

If the image is at (or within a marginal distance from) a distance corresponding to a multiple of the confidence distance at which confidences are lower (as discussed in the summary with reference to FIG. 1B), it is considered to be at a risk. The object is then considered to be at a risk location. In one embodiment the marginal distance is 0, wherein the object is considered to be at a risk location only of the distance d is a multiple of the confidence distance. In one embodiment the marginal distance is 1, 2 or 5 pixels. In one embodiment the marginal distance is dependent on the confidence distance cd, and is for example 5%, 10%, 20%, or 25% of the confidence distance. In one embodiment the marginal distance is dependent on the resolution of the image, and is 1%, 2%, or 5% of the resolution. In one embodiment the marginal distance is dependent on the size of the object in the relevant direction, and is for example 1%, 2%, 5%, or 10% of the size of the object in the relevant direction.

In one embodiment the confidence distance is not a single distance (such as a pixel), but a range of pixels indicting a range or area where the confidence is lower.

In one embodiment the points, ranges or areas, where the confidence is lower does not start at multiple of the confidence distance from the edge of the image, but a distance constant is taken into account when comparing the distance d to the confidence distance. In one embodiment the distance constant is added to the multiplied confidence distance, but as a skilled person would understand it does not matter whether the distance constant is added to the distance or to the multiplied confidence distance. The distance constant is equal to or larger than 0 and less than the confidence distance (in the corresponding extent).

In one such embodiment, where it is determined that the object is at risk based on the distance, it is determined if the object is at risk because it is at a horizontal distance matching the confidence distance (i.e. at or within a range of and possibly taking into account a distance constant) and/or at a vertical distance matching the confidence distance. If the object is at risk due to any or both such distances matching the confidence distance, the detection is compensated for regardless of the extent of the object. In one such embodiment, the compensation may be more effective (i.e. applied to a higher degree) if the matching distance corresponds to the extent of the object 11.

In one embodiment, the object is determined to be horizontal or vertical only if it is determined to be at a risk location. In such an embodiment, the location is refined by determining if it is the corresponding distance (vertical distance for a vertical object and horizontal distance for a horizontal object) that is at the risk location. If not, there is no risk. This has the benefit of only classifying the object if it is needed.

In one embodiment, the object is determined to be horizontal or vertical prior to the determination if it is determined to be at a risk location, wherein only the corresponding distance (vertical distance for a vertical object and horizontal distance for a horizontal object) is used when determining if the object is at a risk location. This has the benefit of only investigating the corresponding distance and not both.

In one embodiment, the object is determined whether to be at risk based both on the horizontal distance and on the vertical distance. The distance d is then both the horizontal distance and the vertical distance, which are each compared to a multiple of a corresponding confidence distance (possibly taking into account a distance constant).

The teachings herein, although focused on adapting for only one direction, may be used to adapt based on both directions. The adaptation may be performed simultaneously, or in series.

By adapting for both the horizontal and for the vertical extent a more robust detection is achieved.

As is discussed in the summary, the size of the object is not the primary influence, the location is. However, the inventors have realized that if the object is small in comparison to the resolution, i.e. the object has an extension in the relevant direction (vertical for vertical objects, and horizontal for horizontal objects) that falls below a size threshold, the confidence distance will decrease two-fold or be halved starting from a higher confidence distance representing larger objects. Alternatively, if the object has an extension in the relevant direction (vertical for vertical objects, and horizontal for horizontal objects) that falls above a size threshold, the confidence distance will increase two-fold or be halved starting from a lower confidence distance representing smaller objects. Or, to phrase it slightly differently, if the object has an extension in the relevant direction (vertical for vertical objects, and horizontal for horizontal objects) that falls above a size threshold, the object is considered to be at a risk location if the distance d is determined to be at (or within a margin of) an even multiple of the confidence distance and if the object has an extension in the relevant direction (vertical for vertical objects, and horizontal for horizontal objects) that falls below the size threshold, the object is considered to be at a risk location if the distance d is determined to be at (or within a margin of) any multiple of the confidence distance, the confidence distance thus being specified for the smaller objects.

In one embodiment the size threshold is 64, 128 or 256 pixels. In one embodiment the size threshold is dependent on the resolution in the relevant direction, for example being $\frac{1}{4}$, $\frac{1}{8}$ or $\frac{1}{16}$ of the resolution.

As can be seen, the risk classification 314 may be made in many different manners and in different orders. As can be seen from the embodiments above, the risk classification 314 may be done before the object detection 315 or after the object detection 315 as a confidence C has been produced and is to be compared to the class threshold.

In one embodiment, the risk classification 314 is performed after the object detection 315 and takes the provided confidence C into account.

In one such embodiment, the risk classification 314 determines whether the provided confidence C has failed to reach the (relevant) class threshold, i.e. the confidence level required for the object to be determined as being of a specific class. If the provided confidence C has failed to reach the (relevant) class threshold, the risk classification 314 determines whether the object detection 315 is to be compensated accordingly, by performing any of the risk classifications described above, i.e. to determine the location and/or the class of the object as above.

In an alternative or additional such embodiment, the risk classification 314 determines whether the provided confidence C is within a confidence range indicating a risk, and if so, the risk classification 314 determines whether the object detection 315 is to be compensated accordingly, by performing any of the risk classifications described above, i.e. to determine the location and/or the class of the object as above. In one such embodiment, the confidence range is the range below the class threshold value, which renders this embodiment to be the embodiment described directly above. In an alternative embodiment, the confidence range is based on the class threshold value, for example 75-100% of the class threshold, 50-100% of the class threshold or 25-100% of the class threshold. In an alternative embodiment, the range is based on absolute numbers, for example 0.75-1, 0.5-1 or 0.25-1.

In an alternative or additional such embodiment, the confidence interval is dependent on the location and more particularly the distance from the relevant (i.e. closest) multiple of the confidence distance. Where a shorter distance provides for a lower confidence interval (i.e. reaching lower confidences).

To perform the risk classification 314 after a confidence C has been provided has the benefit that the detection is only compensated when actually needed as expressed by a low confidence value.

If an object has been determined to be at risk (whether before or after an (initial) object detection has been performed), the object detection is compensated accordingly through a compensated detection 315.

Figure 3B:
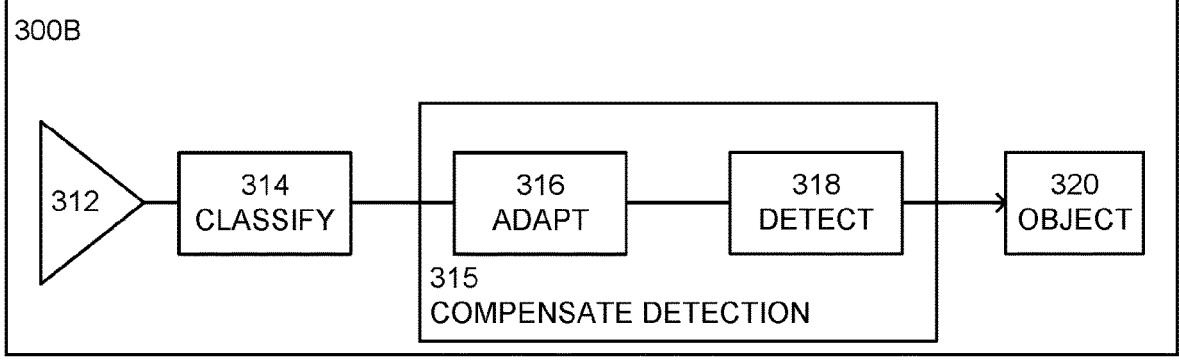
FIG. 3B shows a schematic view of an alternative object detection model according to one embodiment of the teachings herein.

FIG. 3B shows a schematic view of an alternative object detection model 300B according to one embodiment of the teachings herein. The object detection model 300B is arranged to be executed by a controller 101 of on object detection arrangement 100 according to herein, a software module arrangement 500 (see FIG. 5) according to herein, an arrangement comprising circuitry 600 (see FIG. 6) according to herein or being utilized by a method according to herein. It should be noted that different parts of the object detection model may be executed by different parts of the corresponding executing arrangement.

The object detection model 300B is an alternative embodiment of the object detection model 300A of FIG. 3A and further comprises an adaptation 316. In the example of FIG. 3B, the adaptation 316 is comprised in the compensated detection 315. The embodiments discussed in relation to FIG. 3A relate to the example of FIG. 3B and as discussed for those embodiments, the embodiments discussed in relation to FIG. 3B may be performed so that the risk classification 314 is performed before or during the compensated detection (i.e. as a confidence value has been detected).

In one embodiment the compensated detection 315 comprises adapting 316 the detection by adapting parameters of the object detection, such as the threshold or the confidence provided for the detection.

In one such embodiment the compensated detection 315 comprises adapting 316 the detection by lowering the class threshold for the suspected or relevant class. In one such embodiment the threshold is lowered an amount based on the distance from a multiple of the confidence distance cd, the closer the object is to the multiple of the confidence distance, the lower the threshold. As a skilled person would understand, lowering the threshold has basically the same effect as increasing the confidence whereby the two are alternatives and substantially interchangeable with one another.

Alternatively, instead of lowering the threshold, the confidence C determined or to be confirmed for the object 11 may be boosted or increased as the adaptation 316. In one such embodiment the confidence is increased an amount based on the distance from a multiple of the confidence distance cd, the closer the object is to the multiple of the confidence distance, the higher the confidence.

In one embodiment these two approaches are combined where the threshold is lowered at the same time as the confidence is increased. This has the benefit of not lowering the threshold or increasing the confidence too much, which avoids an object of another type to be incorrectly classified simply because the threshold was lowered too much.

To summarize, the main principle of the model 300B of FIG. 3B is that it is an additional step in convolutional neural networks, based on multi-scale structures such as discussed in the background section and in the summary, where the confidence-level of candidate objects is adjusted based on an estimate on the impact of the exact position of the object in the image. That estimate depends on the position in relation to the design of the multi-scale network model, the size and aspect ratio of the object, as well as other potential factors. An alternative, but very similar approach, is to dynamically adjust the threshold values of the individual candidate objects instead of adjusting their confidence levels, since a positive identification is determined by whether the confidence level is above a certain threshold.

In another embodiment, the adaptation 316 and/or the risk classification 314 are mapped to a table stored in the memory 102 (or remotely), and the controller is configured to perform a lookup for each object, based on the object properties or a function thereof. Such a table-structure would be multi-dimensional, so the value for the adaptation (threshold and/or confidence adaptation) can depend on size of object, alignment of object, aspect ratio, but also for example which class of object (e.g. person, bottle, horse, etc.). The table lookup would thus provide an adaptation 316 of the compensated detection 315 based on an implicit classification 314 represented by the values stored in the table. In one such embodiment, the controller is configured to classify 314 whether the object to be detected 11 is at risk of being incorrectly detected based on the distance d and to adapt 316 the object detection parameters by retrieving the parameters to be used through a table lookup, wherein the look up table carries parameters to be used for objects depending on the distance d.

In another embodiment, a simpler neural network (or other machine learning algorithm or model) corresponding to the model 300B is trained to determine the adaptation, and during execution of the object detection's CNN this smaller neural network 300B is used to compute the risk and/or adaptation.

In some embodiments, the alignment compensation function can be found for example by "sweeping" the input of the object detector with objects of known sizes, positions, and aspect ratios ("golden truth"), and compare the output of the object detector to the golden truth. A regressor could be trained using the object detector output as input and aspect ratios, size and/or locations according to the golden truth as target output.

Figure 3C:
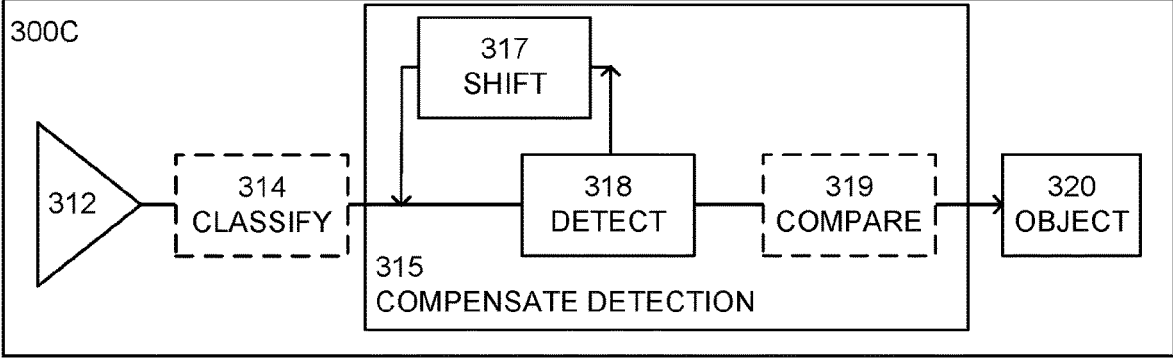
FIG. 3C shows a schematic view of an alternative object detection model according to one embodiment of the teachings herein.

FIG. 3C shows a schematic view of an alternative object detection model 300C according to one embodiment of the teachings herein. The object detection model 300C is arranged to be executed by a controller 101 of on object detection arrangement 100 according to herein, a software module arrangement 500 (see FIG. 5) according to herein, an arrangement comprising circuitry 600 (see FIG. 6) according to herein or being utilized by a method according to herein. It should be noted that different parts of the object detection model may be executed by different parts of the corresponding executing arrangement.

Figure 3D:
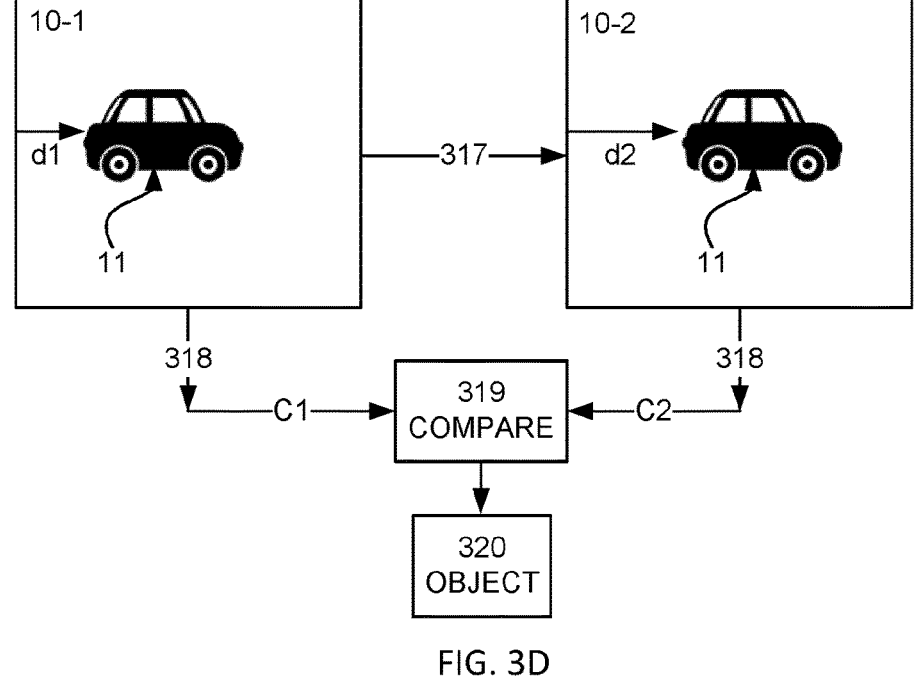
FIG. 3D shows a schematic view of shifting images for a compensated detection according to one embodiment of the teachings herein.

FIG. 3D shows a schematic view of how two images are compared according to the model 300c of FIG. 3C as per the teachings herein. The model 300C of FIG. 3C will be described with simultaneous reference to FIGS. 3C and 3D.

The object detection model 300C is an alternative embodiment of the object detection model 300A of FIG. 3A and the compensated detection 315 comprises a shifting module 317 for shifting an image 10. In such an embodiment the image 10 may be shifted in one or both directions (vertical and/or horizontal). As the detection is effected by the location of the object 11, any shift in the image, will effectively put the object at a different location and will thus provide a different result for the detection. FIG. 3D shows how an image is shifted 317, wherein the object 11 in the first instance of the image 10-1 is at a first distance d1, and at a second distance d2 in the second instance of the image 10-2. In FIG. 3D, the shift is sideways affecting the horizontal distance, but it should be noted that the shift may be in any or both of a horizontal and vertical direction. It should also be noted that the shift may be in any horizontal or vertical direction, i.e. left or right and/or up or down, even if exemplified to be to the left in FIG. 3D.

In FIG. 3D the object 11 has been shifted a distance equaling the difference between the first distance d1 and the second distance d2, i.e. the shifting distance sd=d2–d1. In one embodiment, the object is shifted by the object being shifted in relation to the image. In an alternative embodiment, the object is shifted along with the image, i.e. the whole or a part of the image is translated with the object. The shift is performed in the general direction being adapted for, giving a shift in a horizontal direction or a vertical direction, or a shift in both directions To ensure that a shift is not simply placing the object 11 at a different risk location, the shifting distance is different from the confidence distance. In one embodiment, the shift distance is less than the confidence distance, sd<cd. As the confidence drops rapidly at or close to a risk location, the shifting distance does not need to be large, but in one embodiment it is larger than the marginal distance (md) to ensure that the object is shifted away from the risk location, sd>md. In one such embodiment, the shifting distance is larger than twice the marginal distance to ensure that the object is shifted away from the risk location, in case the shifting direction is in a direction towards the risk location, i.e. sd>2×md. The shifting distance is thus, in one embodiment, in the range md<sd<cd. In one embodiment the shifting distance is dependent on the resolution of the image, and is for example 1%, 2% or 5% of the resolution. In one embodiment the shifting distance is dependent on the confidence distance cd, and is for example 5%, 10%, 25% or 50% of the confidence distance. In one embodiment the shifting distance is dependent on the size of the object 10, in particular the size in the relevant direction H or W, and is for example 5%, 10%, 25% or 50% of the size of the object 11. In on embodiment the shifting distance is the distance from the object 10 to a position in between two risk locations, i.e. the shifting distance equals half the confidence distance plus the distance from the object to the relevant multiple of the confidence distance. In one embodiment the shifting distance is determined based on one object 10. However, in certain situations there are several objects that are at risk locations. To overcome this, one embodiment provides a shifting distance and a shifting of the image for one or more of the several objects for a targeted object detection so that all objects may be detected properly after a corresponding shift. In an alternative embodiment, the shifting distance is determined so that all (or at least most) objects to be detected are moved away from a risk location. In such an embodiment, the shifting distance is the average of individual shifting distances determined for each object as if it was the only object to be detected. In one embodiment the controller is further configured to determine the shifting distance by also ensuring that no (or at least few) objects that were not previously at risk are moved into a risk location. It should be noted that as the shifting provides for two detections, which are compared, there is very little risk in that an object would not be successfully detected in one of the detections—at least as affected by the distance into the image.

The manners for determining the shifting distances are not exclusive and may be combined.

In one embodiment, the image 10 is shifted if the risk classification 314 indicates that the object 11 is at risk. This avoids any unnecessary shifting of the image. However, in one embodiment, the image may be shifted regardless of the risk classification whereby the risk classification is seen as part of the shifting in that all images are seen as to be at risk and compensated for. The specific and separate proceedings of a risk classification are thus optional in such an embodiment, as they are implicit in the structure of the model. The shifting 317 of the image is then seen as to be the risk classification 314.

In one embodiment, the same image 10 is shifted so that two instances of the same image are processed and detected. In FIG. 3C this is indicated by the feedback from the detection 318 via the shift 317 back into the detection 318. In FIG. 3D the first instance 10-1 is thus an unshifted instance of the image 10, and the second instance 10-2 is a shifted instance of the image 10. This enables the object detection arrangement 100 to provide two confidences C1 and C2, one for each instance and determine if any of them provides for a successful detection through a comparison 319 of the confidences or the results of the detections, being represented in FIG. 3D by the confidences C1, C2.

In situations where there is a number of objects in the image, then there might be some candidate objects being at risk, while others are not. In such a situation the shifting may bring some new objects to be at risk. How much the objects should be compensated for would be a tradeoff based on a number of factors. One practical solution would be to shift an amount that statistically maximizes the probability that at least one of the two executions would provide risk free objects (perhaps half a cd). Or, if there are e.g. two objects at risk and they are both aligned in a similar way, then the shift could be made according to what makes most sense for those two circumstances.

This enables the object detection arrangement 100 with a second chance of properly or successfully detecting an object, in case a first detection is unreliable or unsuccessful, by shifting the image and feeding it back through the detection and then comparing the detection result. If the bad detection result is a consequence of the object being at a risk location, the shift will take care of this (wherein the comparison 319 acts as a classifier of the risk 314).

However, if the bad detection is for another reason, the shift will not resolve this. To prevent unnecessary processing of shifted images, a risk classification 314 is beneficially performed before the image is shifted.

In one embodiment the image to be shifted is not the same image as the first image, but a subsequent image, such as a next frame in a video stream. In such an embodiment a second frame (second image) is shifted 317 if it is determined that the first frame (first image) is at a risk location and/or provided a low confidence.

As a detection has been compensated through a shift, the results may be compared 319 and the detection result that has the highest confidence is chosen to be the detected object 320 (assuming that the detection result corresponds to a sufficiently high confidence).

The shifting of an image 317 is one manner of a compensated detection 315 of an object at risk, and any of the manners of determining whether an object is to receive a compensated detection or not, i.e. the risk classification 314 taught herein applies to such embodiments as well.

In one embodiment the shifting distance is a function of an object's movement and may be determined based on location and/or ratio (width-height ratio) of an object. The risk classification 314 is in one such embodiment, arranged to predict if the object will be at a risk location in a subsequent or next image, and if so preemptively shift 317 the image before any detection is made, as part of the compensated detection 315. The prediction may also predict the distance the object will need to be shifted, i.e. to determine the shifting distance, to ensure that the object is not at a risk location in the subsequent or second image 10-2.

Figure 3E:
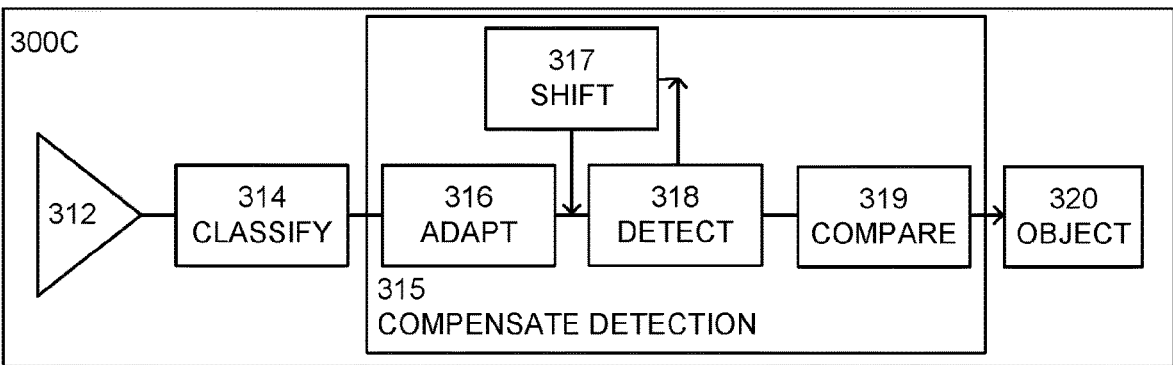
FIG. 3E shows a schematic view of an alternative object detection model according to one embodiment of the teachings herein.

FIG. 3E shows a schematic view of an alternative object detection model 300D according to one embodiment of the teachings herein. The object detection model 300D is arranged to be executed by a controller 101 of on object detection arrangement 100 according to herein, a software module arrangement 500 (see FIG. 5) according to herein, an arrangement comprising circuitry 600 (see FIG. 6) according to herein or being utilized by a method according to herein. It should be noted that different parts of the object detection model may be executed by different parts of the corresponding executing arrangement.

The object detection model 300D is an alternative embodiment of the object detection model 300A of FIG. 3A and further comprises both the adaptation 316 of the model 300B of FIG. 3B and the shifting of the model 300C of FIG. 3D.

This enables for the detection to be compensated by selecting to adapt 316 the parameters of the detection, to shift the image and/or to do both. As the adaptation 316 has a low overhead it is beneficially used to reduce the computational effort needed. However, as the shifting provides a comparative result indicating how well the compensation worked it is beneficially used to ensure a proper or successful detection. Combining the two enables the objet arrangement to determine if a parameter adaptation is successful or not, and if not adjust the parameters, and if successful continue using only the adaptation 316.

In such an embodiment the controller 101 is configured to utilize both adaptation 316 and shifting 317 initially (or for one or more images) in order to set the parameters for the adaptation 316 so that a proper result is achieved (a proper result meaning a sufficiently high detection success as required by a designer or an application). In one embodiment the combined approach is done initially to start up a system. In one embodiment the combined approach is done as a new type of object is to be detected. In one embodiment the combined approach is done as a detection success rate falls below a threshold success rate. In one embodiment the combined approach is performed as a background process in order to validate the compensated detection 315.

The detection parameters are adapted so that future detections will provide less difference in object detection results. In one embodiment, the confidence is increased and/or the threshold is lowered if the second object detection (i.e. of the object detection of the shifted image) provides a more reliable result (i.e. having a higher confidence). In one embodiment, the confidence is increased and/or the threshold is lowered based on a difference in confidences provided by the first object detection (i.e. of the unshifted image) and the second object detection (i.e. of the shifted image). In one such embodiment, the confidence is increased and/or the threshold is lowered an amount equaling the difference in confidences times a constant K, wherein the constant K is 0.25, 0 5 or 1. This enables the adaptation to render any differences in confidence negligible, at least for repeated adaptations and shifts for a series of images, such as when initializing or training the object detection.

In one embodiment the combined approach is utilized so that the adaptation 316 is performed locally by the controller 101 of the object detection arrangement 100 and the shifting and consequent comparison 319 is performed by a remote controller. This enables for the local controller to manage the computational load even when being of small capacity or while not using too much of its capacity and leaving the larger computations to a remote controller, probably having larger resources.

The combined approach is thus arranged in one embodiment to utilize the shifting to set up the adaptation.

The combined approach is thus also or alternatively arranged in one embodiment to utilize the shifting to align or correct the adaptation.

The combined approach is thus also or alternatively arranged in one embodiment to utilize the shifting to validate the adaptation.

It should be noted that even though the description herein is focused on one relevant direction, both directions may be considered relevant and where a risk classification is performed for both directions simultaneously. The risk classification may provide that the object is at risk of being incorrectly classified based on the location if the vertical, the horizontal or both are at a corresponding risk location (as discussed above). The embodiments discussed above may thus be combined as regards to processing both directions, by themselves or in combination.

As would be understood by a skilled person the models 300A, 300B, 300C and 300D are all examples of models that may be comprised in a general CNN model and are thus to be seen as additions or supplementations to such a CNN model.

As would also be understood by a skilled person, even though the description herein is mainly focused on one image, the teachings herein may beneficially also be applied to a series of images, such as a video stream. In particular the embodiments as discussed in relation to FIGS. 3C and 3D may be applied to such series of images.

Figure 4A:
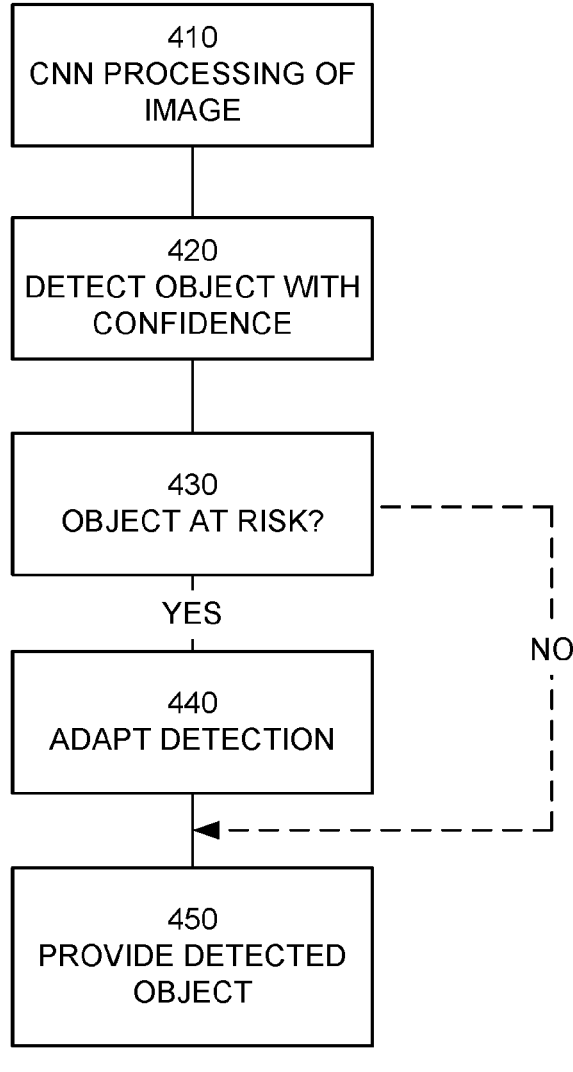
FIG. 4A shows a flowchart of a general method according to an embodiment of the present invention.

FIG. 4A shows a general flowchart for a method according to the teachings herein. The method corresponds to the object detection model 300 of FIG. 3A. Image data is received 410 from an image receiving device 112, 312, wherein the image data has been or is to be processed in a CNN for detection 420 of an object in the image data. It is determined whether the object to be detected is at risk or not 430, and if so the detection is adapted accordingly 440 and the object is detected 420 and provided 450.

It should be noted that the actual object detection may be performed prior to or after the classification if the object is at risk, or both.

Figure 4B:
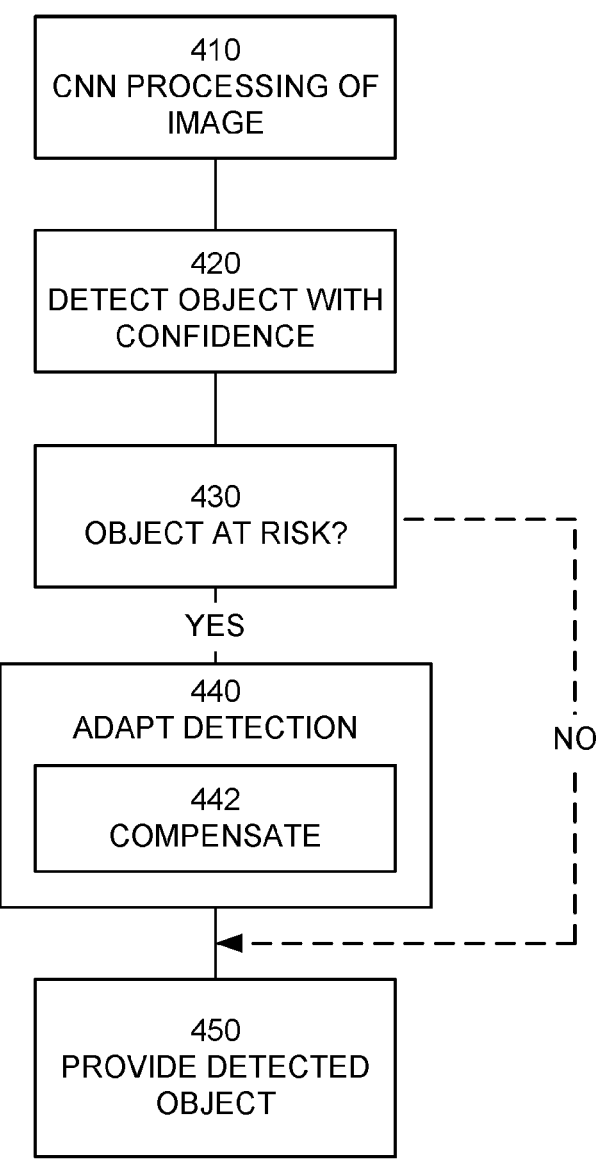
FIG. 4B shows a flowchart of a general method according to an embodiment of the present invention.

FIG. 4B shows a general flowchart for a method according to the teachings herein. The method corresponds to the object detection model 300 of FIG. 3B. The flowchart represents an implementation of the method represented by the flowchart in FIG. 4A and similarities will not be discussed but simply be taken to be included. In the embodiments covered by FIG. 4B and as discussed above, the adaptation 440 is done by compensating 442 the detection. The compensation may be done by adapting the confidence or by adapting the threshold values used, or both.

Figure 4C:
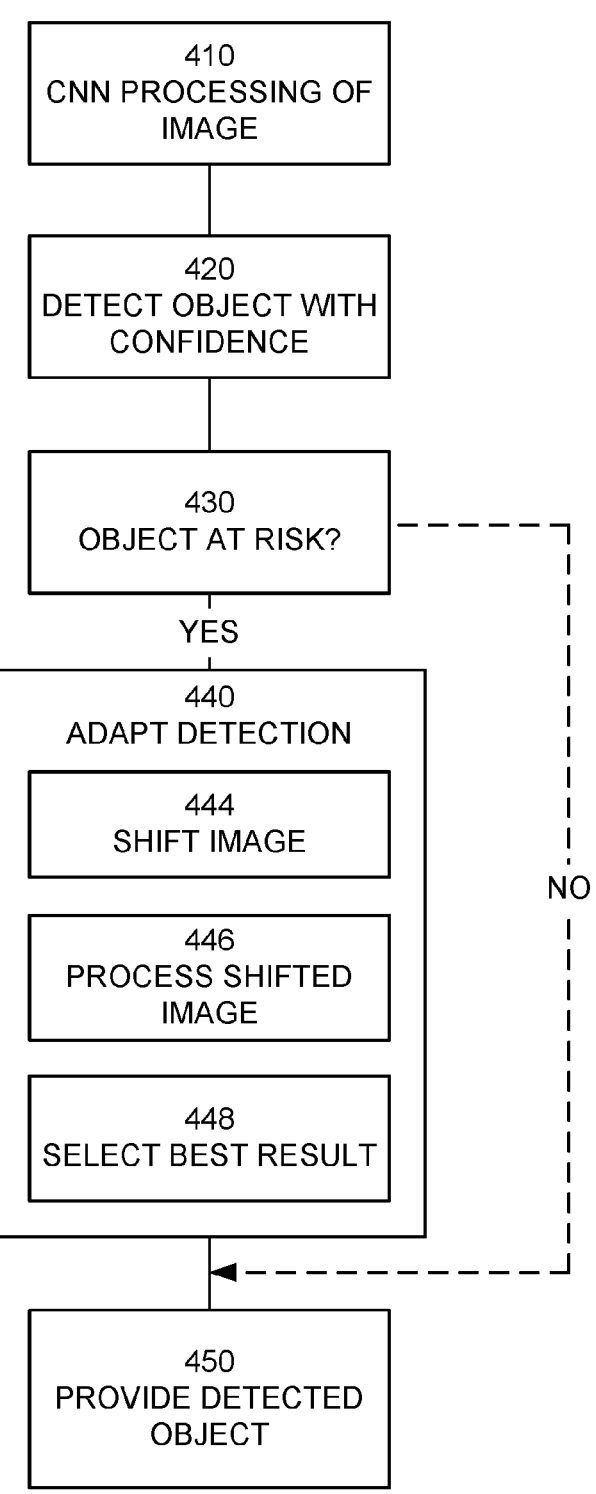
FIG. 4C shows a flowchart of a general method according to an embodiment of the present invention.

FIG. 4C shows a general flowchart for a method according to the teachings herein. The method corresponds to the object detection model 300 of FIG. 3C. The flowchart represents an implementation of the method represented by the flowchart in FIG. 4A and similarities will not be discussed but simply be taken to be included. In the embodiments covered by FIG. 4C and as discussed above, the adaptation 440 is done by shifting 444 the object and/or the image, process 446 the shifted image/object and selecting 448 the best result.

Figure 4D:
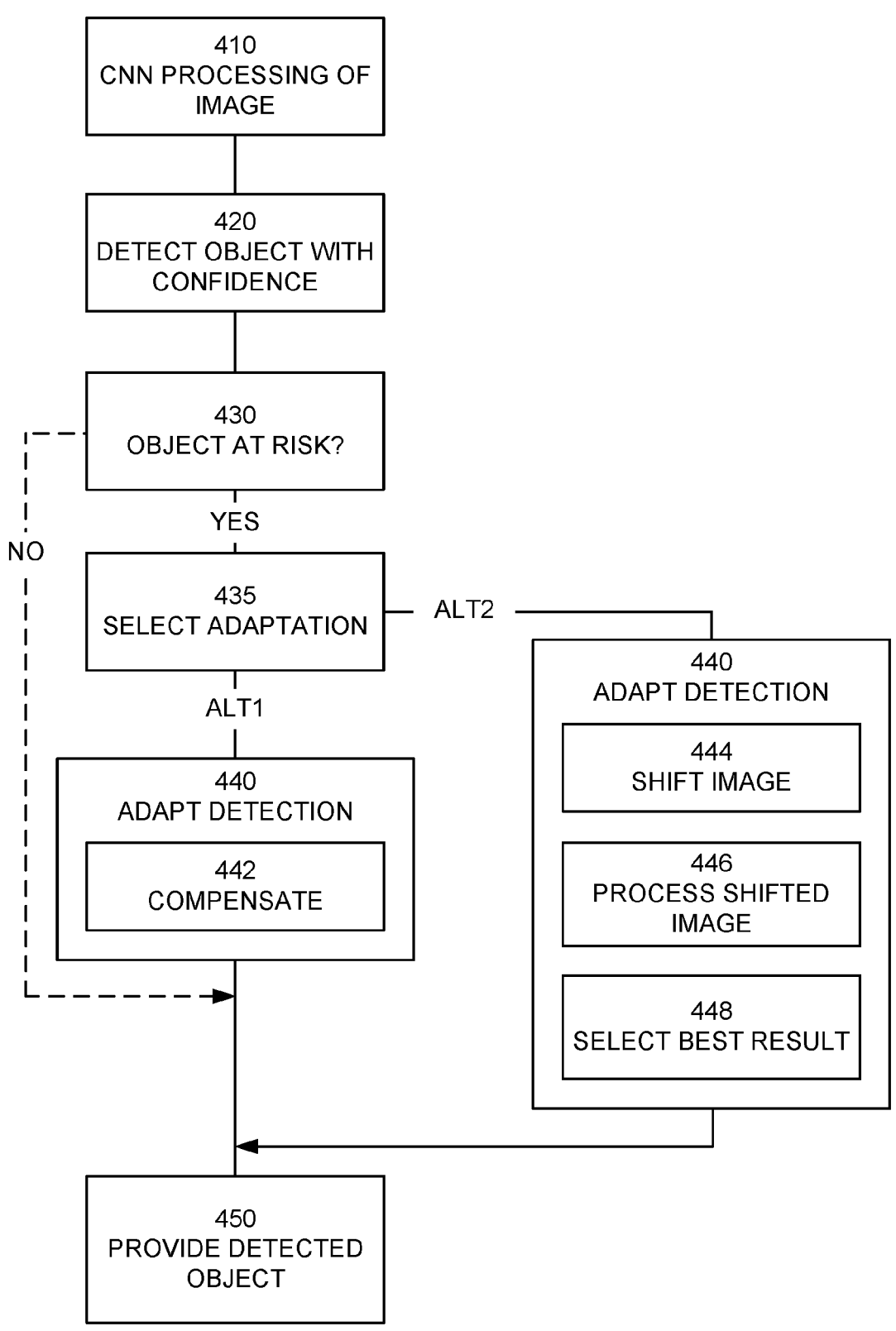
FIG. 4D shows a flowchart of a general method according to an embodiment of the present invention.

FIG. 4D shows a general flowchart for a method according to the teachings herein. The method corresponds to the object detection model 300 of FIG. 3E. The flowchart represents an implementation of the method represented by the flowchart in FIG. 4A where the implementations of FIG. 4B and FIG. 4C have been combined and similarities will not be discussed but simply be taken to be included. In the embodiments covered by FIG. 4D and as discussed above, the adaptation 440 is done by selecting 435 an adaptation according to FIG. 4B (ALT1) or according to FIG. 4C (ALT2). It should be noted that the selection need not be exclusive, but both alternatives may be chosen FIG. 5A shows a component view for a software module (or component) arrangement 500 according to an embodiment of the teachings herein. The software module arrangement 500 is adapted to be used in an object detection arrangement 100 as taught herein for providing object detection as taught herein and for enabling the object detection arrangement 100 to execute a method according to FIG. 4A.

The software module arrangement 500 comprises a software module for receiving (510) image data. The software module arrangement 500 also comprises a software module 520 for processing the image data CNN for detection of an object in the image data, a software module 530 for determining whether the object to be detected is at risk or not, and a software module 540 for adapting the detection accordingly if so. The software module arrangement 500 also comprises a software module 550 for providing the object.

FIG. 5B shows a component view for a software module (or component) arrangement 500 according to an embodiment of the teachings herein. The software module arrangement 500 is adapted to be used in an object detection arrangement 100 as taught herein for providing object detection as taught herein and for enabling the object detection arrangement 100 to execute a method according to FIG. 4B.

The software module arrangement 500 represents an implementation of the software module arrangement 500 in FIG. 5A and similarities will not be discussed but simply be taken to be included. In the embodiments covered by FIG. 5B and as discussed above, the software module for adaptation 540 comprises a software module 542 for compensating the detection. The compensation may be done by adapting the confidence or by adapting the threshold values used, or both.

Figure 5C:
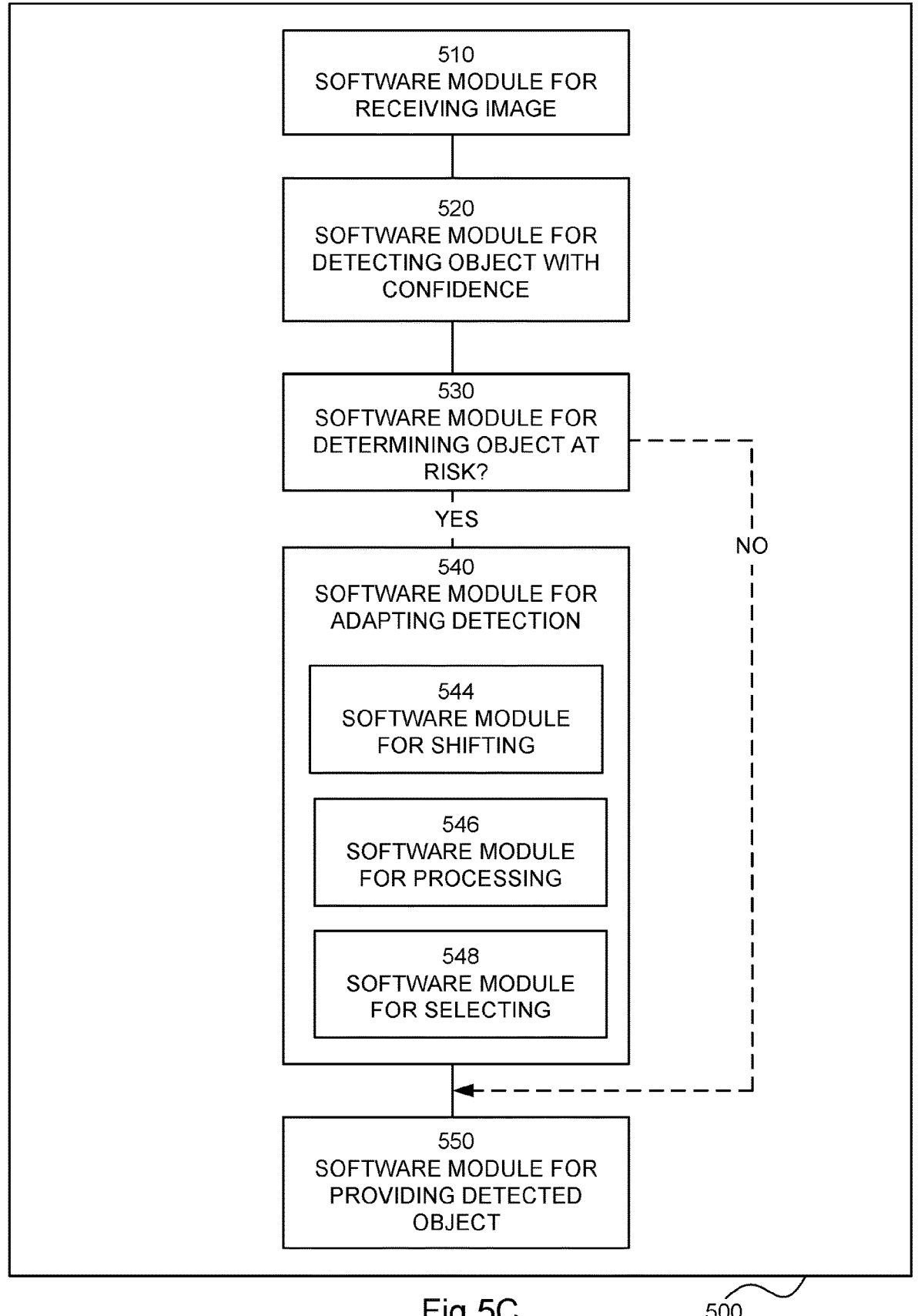
FIG. 5C shows a component view for a software module arrangement according to an embodiment of the teachings herein.

FIG. 5C shows a component view for a software module (or component) arrangement 500 according to an embodiment of the teachings herein. The software module arrangement 500 is adapted to be used in an object detection arrangement 100 as taught herein for providing object detection as taught herein and for enabling the object detection arrangement 100 to execute a method according to FIG. 4C.

The software module arrangement 500 represents an implementation of the software module arrangement 500 in FIG. 5A and similarities will not be discussed but simply be taken to be included. In the embodiments covered by FIG. 5C and as discussed above, the software module for adaptation 540 comprises a software module 544 for shifting the image, a software module 546 for processing the shifted image and a software module 548 for selecting the best result.

FIG. 5D shows a component view for a software module (or component) arrangement 500 according to an embodiment of the teachings herein. The software module arrangement 500 is adapted to be used in an object detection arrangement 100 as taught herein for providing object detection as taught herein and for enabling the object detection arrangement 100 to execute a method according to FIG. 4D.

The software module arrangement 500 represents an implementation of the software module arrangement 500 in FIG. 5A, being a combination of the software module arrangement 500 of FIGS. 5B and 5C and similarities will not be discussed but simply be taken to be included. In the embodiments covered by FIG. 5D and as discussed above, the software module arrangement 500 comprises a software module 535 for selecting which adaptation to be used, the adaptation according to figure B and/or the adaptation according to FIG. 5C. In alternative or additional embodiments the software module arrangement 500 also comprises software modules for executing any, some or all of the method embodiments discussed in relation to FIGS. 4A, 4B, 4C and 4D. In alternative or additional embodiments the software module arrangement 500 also comprises software modules for executing any, some or all of the controller's configurations as discussed in relation to FIGS. 2A, 2B, 2C as well as FIGS. 3A, 3B, 3C and 3D, wherein such software modules are seen to be comprised in the software module for classification 530 and the software module for compensated detection 540.

FIG. 6A shows a component view for an arrangement comprising circuitry for object detection 600 according to an embodiment of the teachings herein. The arrangement comprising circuitry for object detection 600 is adapted to be used in an object detection arrangement 100 as taught herein for providing object detection as taught herein and for enabling the object detection arrangement 100 to execute a method according to FIG. 4A.

The arrangement comprising circuitry for object detection 600 comprises circuitry for receiving (510) image data. The arrangement comprising circuitry for object detection 600 also comprises circuitry 620 for processing the image data CNN for detection of an object in the image data, circuitry 630 for determining whether the object to be detected is at risk or not, and circuitry 640 for adapting the detection accordingly if so. The arrangement comprising circuitry for object detection 600 also comprises circuitry 650 for providing the object.

FIG. 6B shows a component view for an arrangement comprising circuitry for object detection 600 according to an embodiment of the teachings herein. The arrangement comprising circuitry for object detection 600 is adapted to be used in an object detection arrangement 100 as taught herein for providing object detection as taught herein and for enabling the object detection arrangement 100 to execute a method according to FIG. 4B.

The arrangement comprising circuitry for object detection 600 represents an implementation of the arrangement comprising circuitry for object detection 600 in FIG. 6A and similarities will not be discussed but simply be taken to be included. In the embodiments covered by FIG. 6B and as discussed above, the circuitry for adaptation 640 comprises circuitry 642 for compensating the detection. The compensation may be done by adapting the confidence or by adapting the threshold values used, or both.

FIG. 6C shows a component view for an arrangement comprising circuitry for object detection 600 according to an embodiment of the teachings herein. arrangement comprising circuitry for object detection 600 is adapted to be used in an object detection arrangement 100 as taught herein for providing object detection as taught herein and for enabling the object detection arrangement 100 to execute a method according to FIG. 4C.

The arrangement comprising circuitry for object detection 600 represents an implementation of the arrangement comprising circuitry for object detection 600 in FIG. 6A and similarities will not be discussed but simply be taken to be included. In the embodiments covered by FIG. 6C and as discussed above, the circuitry for adaptation 640 comprises circuitry 644 for shifting the image, circuitry 646 for processing the shifted image and circuitry 648 for selecting the best result.

FIG. 6D shows a component view for a arrangement comprising circuitry for object detection 600 according to an embodiment of the teachings herein. arrangement comprising circuitry for object detection 600 is adapted to be used in an object detection arrangement 100 as taught herein for providing object detection as taught herein and for enabling the object detection arrangement 100 to execute a method according to FIG. 4D.

The arrangement comprising circuitry for object detection 600 represents an implementation of the arrangement comprising circuitry for object detection 600 in FIG. 6A, being a combination of the arrangement comprising circuitry for object detection 600 of FIGS. 6B and 6C and similarities will not be discussed but simply be taken to be included. In the embodiments covered by FIG. 6D and as discussed above, the arrangement comprising circuitry for object detection 600 comprises circuitry 635 for selecting which adaptation to be used, the adaptation according to figure B and/or the adaptation according to FIG. 6C.

In alternative or additional embodiments the arrangement comprising circuitry for object detection 600 also comprises circuitry for executing any, some or all of the method embodiments discussed in relation to FIGS. 4A, 4B, 4C and 4D. In alternative or additional embodiments the arrangement comprising circuitry for object detection 600 also comprises circuitry for executing any, some or all of the controller's configurations as discussed in relation to FIGS. 2A, 2B, 2C as well as FIGS. 3A, 3B, 3C and 3D, wherein such circuitry is seen to be comprised in the circuitry for classification 630 and the circuitry for compensated detection 640.

Figure 7:
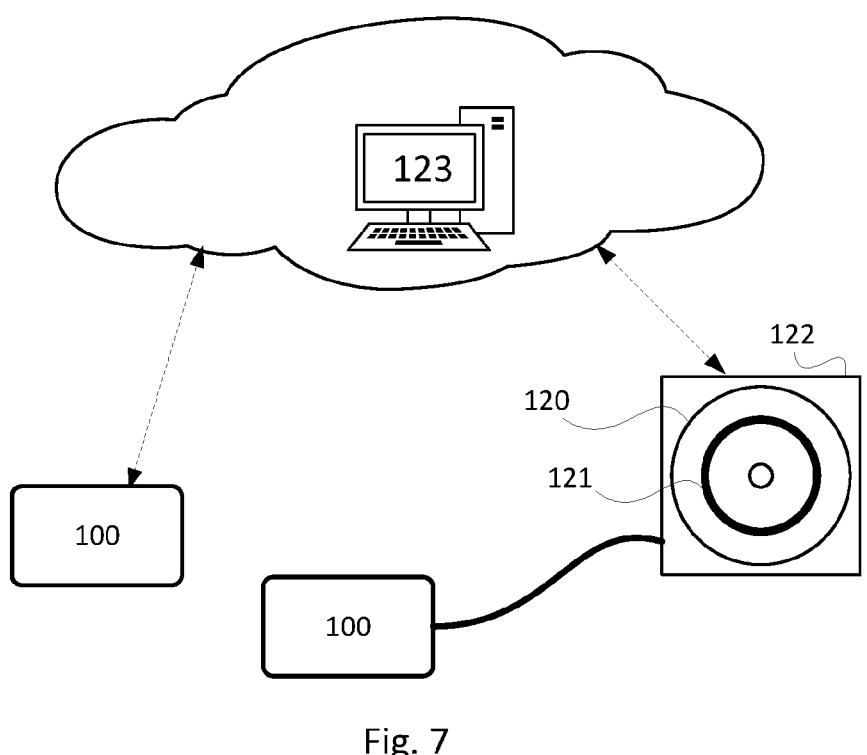
FIG. 7 shows a schematic view of a computer-readable medium carrying computer instructions that when loaded into and executed by a controller of an arrangement enables the arrangement to implement an embodiment of the present invention.

FIG. 7 shows a schematic view of a computer-readable medium 120 carrying computer instructions 121 that when loaded into and executed by a controller of an object detection arrangement 100 enables the object detection arrangement 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 7, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the object detection arrangement 100 for being executed by the controller 101.

The computer disc reader 122 may also or alternatively be connected to (or possibly inserted into) an object detection arrangement 100 for transferring the computer-readable computer instructions 121 to a controller of the object detection arrangement 100 (presumably via a memory of the object detection arrangement 100).

FIG. 7 shows both the situation when an object detection arrangement 100 receives the computer-readable computer instructions 121 via a server connection and the situation when another object detection arrangement 100 receives the computer-readable computer instructions 121 through a wired interface. This enables for computer-readable computer instructions 121 being downloaded into an object detection arrangement 100 thereby enabling the object detection arrangement 100 to operate according to and implement the invention as disclosed herein.

The invention claimed is:

1. An object detection arrangement comprising:
memory configured to receive an image comprising pixel data corresponding to a two dimensional (2D) pixel grid; and
a controller configured to determine whether an object represented in the image is at risk being incorrectly classified by a multi-scale convolutional neural network (CNN) trained to recognize one or more classes of objects, and, responsive to determining that the object is at risk of being incorrectly classified, reduce the risk by adapting a confidence value or a classification threshold of the multi-scale CNN, or by shifting the image within the 2D pixel grid, for processing of the shifted image by the multi-scale CNN;
wherein classification confidence of the multi-scale CNN characteristically varies periodically over the 2D pixel grid, resulting in confidence dips at regularly spaced locations in the 2D pixel grid, and wherein the controller determines whether the object is at risk of being incorrectly classified by evaluating whether a reference point of the object lies within one of the confidence dips.

2. The object detection arrangement of claim 1, wherein the reference point of the object is one of: a center point of the object, or, going from a reference edge of the 2D pixel grid, a starting or ending point of the object.

3. The object detection arrangement of claim 2, wherein the controller is further configured to select either a horizontal edge or a vertical edge of the 2D pixel grid as the reference edge, in dependence on an aspect ratio of the object.

4. The object detection arrangement of claim 2, wherein, to shift the image, the controller is configured to shift the pixel data within the 2D pixel grid by a number of pixels needed to shift the reference point of the object to a location that lies between adjacent confidence dips, and wherein the shift is a horizontal shift in a case where, based on an aspect ratio of the object, the object is deemed to be a horizontal object, and wherein the shift is a vertical shift in a case where, based on the aspect ratio of the object, the object is deemed to be a vertical object.

5. The object detection arrangement of claim 2, wherein the controller is configured to determine whether the reference point of the object lies within one of the confidence dips by:
determining a distance measured in pixels, going from a horizontal or vertical edge of the 2D pixel grid to the reference point of the object; and
determining whether the distance corresponds with an even multiple of the regular spacing, expressed in pixels, between the confidence dips, and wherein the regular spacing depends on a scaling factor of the multi-scale CNN.

6. The object detection arrangement of claim 3, wherein the controller is configured to configured to evaluate whether the reference point on the object lies within one of the confidence dips by determining a distance in pixels from the reference edge to the reference point of the object, and determining whether that distance is within a defined margin of a corresponding multiple of a confidence distance, the confidence distance expressed in pixels and corresponding to the periodicity of the confidence dips.

7. The object detection arrangement of claim 1, wherein the controller is configured to determine whether the object is at risk of being incorrectly classified in response to the confidence value, as produced by the multi-scale CNN for the object, being below the classification threshold.

8. The object detection arrangement of claim 1, wherein the object detection arrangement is a smartphone or a tablet computer.

9. The object detection arrangement of claim 1, wherein the object detection arrangement is an optical see-through device.

10. A method for operation by an object detection arrangement, wherein the method comprises:
receiving an image comprising pixel data corresponding to a two dimensional (2D) pixel grid;
determining whether an object represented in the image is at risk of being incorrectly classified by a multi-scale convolutional neural network (CNN) trained to recognize one or more classes of objects, and, responsive to determining that the object is at risk of being incorrectly classified, reduce the risk by adapting a confidence value or a classification threshold of the multi-scale CNN, or by shifting the image within the 2D pixel grid, for processing of the shifted image by the multi-scale CNN;
wherein classification confidence of the multi-scale CNN characteristically varies periodically over the 2D pixel grid, resulting in confidence dips at regularly spaced locations in the 2D pixel grid, and wherein determining whether the object is at risk of being incorrectly classified comprises evaluating whether a reference point of the object lies within one of the confidence dips.

* * * * *